(12) United States Patent
Pearson et al.

(10) Patent No.: US 6,756,100 B2
(45) Date of Patent: Jun. 29, 2004

(54) TAPE STRIP PADS AND DISPENSER AND METHOD OF DISPENSING INDIVIDUAL TAPE STRIPS

(75) Inventors: Scott D. Pearson, Woodbury, MN (US); Dennis L. Crawford, Roberts, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/334,834

(22) Filed: Dec. 31, 2002

(65) Prior Publication Data

US 2003/0129346 A1 Jul. 10, 2003

Related U.S. Application Data

(63) Continuation of application No. 09/191,649, filed on Nov. 13, 1998, now Pat. No. 6,514,585.

(51) Int. Cl.[7] .................................................. B32B 9/00
(52) U.S. Cl. .................... 428/40.1; 428/41.8; 428/41.9; 428/42.1; 428/194; 428/201; 428/212; 428/220; 428/354; 221/33; 221/45; 221/61; 221/63
(58) Field of Search .............................. 428/40.1, 41.8, 428/41.9, 42.1, 194, 201, 212, 220, 354; 221/33, 45, 61, 63

(56) References Cited

U.S. PATENT DOCUMENTS

| | | | |
|---|---|---|---|
| D116,599 S | 9/1939 | Reinecke | |
| 2,532,011 A | 11/1950 | Dahlquist et al. | |
| 2,607,711 A | 8/1952 | Hendricks | |
| 2,926,105 A | 2/1960 | Steinhauser et al. | |
| 2,927,868 A | 3/1960 | Revoir | |
| 3,331,729 A | 7/1967 | Danielson et al. | |
| 3,578,622 A | 5/1971 | Brown et al. | |
| 3,691,140 A | 9/1972 | Silver | |
| 4,279,717 A | 7/1981 | Eckberg et al. | |
| 4,313,900 A | 2/1982 | Gonzales, Jr. et al. | |
| 4,416,392 A | 11/1983 | Smith | |
| 4,421,904 A | 12/1983 | Eckberg et al. | |
| 4,562,938 A | 1/1986 | Loder | |
| 4,586,629 A | 5/1986 | Loder | |
| 4,586,631 A | 5/1986 | Loder | |
| 4,587,156 A | 5/1986 | Wu | |
| 4,650,706 A | 3/1987 | Emmel | |
| 4,653,666 A | 3/1987 | Mertens | |
| 4,699,842 A | 10/1987 | Jorgensen et al. | |
| 4,742,913 A | 5/1988 | Emmel et al. | |
| 4,770,320 A | 9/1988 | Miles et al. | |
| 4,781,306 A | 11/1988 | Smith | |
| 4,835,217 A | 5/1989 | Jorgensen et al. | |
| 4,895,746 A | 1/1990 | Mertens | |
| 4,921,127 A | 5/1990 | Windorski | |
| 4,928,864 A | 5/1990 | Walker et al. | |
| 4,986,440 A | 1/1991 | Windorski | |

(List continued on next page.)

*Primary Examiner*—Nasser Ahmad
(74) *Attorney, Agent, or Firm*—George W. Jonas

(57) ABSTRACT

A W-stacked pads of tape strips dispensable at a low peel angle, comprising a plurality of superimposed tape strips longitudinally reversed so as to align the first end of each tape strip with the second end of an immediately overlaying and an immediately underlying tape strip. The individual tape strips having first and second longitudinal end portions with differential release characteristics, with the second end portion of each tape strip adhered to the first end portion of an adjacent tape strip at an adhesion level having an adhesive strength sufficient to allow release of the second end portion of an intermediate tape strip relative to the first end portion of an immediately underlying tape strip when an immediately overlying tape strip is dispensed from the pad at a low peel angle, while preventing any appreciable longitudinal movement of the second end portion of an intermediate tape strip relative to the first end portion of an immediately underlying tape strip when an immediately overlying tape strip is dispensed from the pad at a high peel angle.

13 Claims, 10 Drawing Sheets

U.S. PATENT DOCUMENTS

| | | |
|---|---|---|
| 4,993,590 A | 2/1991 | Windorski |
| 5,080,254 A | 1/1992 | Feer |
| 5,080,255 A | 1/1992 | Windorski |
| 5,143,250 A | 9/1992 | Freitag |
| 5,299,712 A | 4/1994 | Carlson et al. |
| D348,484 S | 7/1994 | Blackwell et al. |
| D348,690 S | 7/1994 | Samuelson |
| 5,328,653 A | 7/1994 | Hyde et al. |
| 5,332,797 A | 7/1994 | Kessel et al. |
| 5,358,141 A | 10/1994 | Carlson et al. |
| 5,401,547 A | 3/1995 | Blackwell et al. |
| 5,411,788 A | 5/1995 | Hyde et al. |
| D359,513 S | 6/1995 | Carlson |
| 5,460,863 A | 10/1995 | Kessel et al. |
| 5,518,144 A | 5/1996 | Samuelson et al. |
| 5,607,737 A | 3/1997 | Blackwell et al. |
| 5,697,518 A * | 12/1997 | Callahan .................. 221/34 |

\* cited by examiner

TAPE STRIP PADS AND DISPENSER AND METHOD OF DISPENSING INDIVIDUAL TAPE STRIPS

CROSS REFERENCE TO RELATED APPLICATIONS

This application is a continuation of U.S. Pat. No. 09/191,649, filed Nov. 13, 1998 now U.S. Pat. No. 6,514,585 which has now been allowed.

FIELD OF THE INVENTION

The invention broadly relates to (i) pads of pressure sensitive adhesive tape strips, (ii) dispensers for tape strip pads, and (iii) methods of dispensing individual tape strips from tape strip pads.

BACKGROUND OF INVENTION

Numerous types of pressure sensitive adhesive tapes capable of connecting or joining two surfaces (e.g. adhering a sheet of paper onto a table top) are well known. For example, #810 Scotch™ Magic™ brand transparent tape, manufactured by Minnesota Mining and Manufacturing Company, St. Paul, Minn. is readily available from numerous retail outlets. Such pressure sensitive adhesive tapes, including #810 Scotch™ Magic™ brand transparent tape, are generally available as a continuous roll of tape capable of being conveniently dispensed from any of a number of manually-operated roll-type tape dispensers, such as those disclosed in U.S. Pat. No. 4,928,864 and U.S. Design Pat. No. 116,599, having a cutting edge located on the dispenser for cutting the tape into strips of the desired length. While effective for quickly and efficiently dispensing most pressure sensitive adhesive tapes, it is difficult to create tape strips of uniform length due to the natural variations in the length of tape unwound from the roll of adhesive tape between cuttings. Hence, such dispensers are not suitable for those situations requiring the quick and efficient dispensing of uniform lengths of pressure sensitive adhesive tape.

It is also known to dispense pressure sensitive adhesive tape, such as Scotch™ Magic™ brand transparent tape, from a stacked pad of tape strips. Such pads of adhesive tape strips are disclosed, U.S. Pat. Nos. 4,650,706, and 4,895,746. Both '706 and '746 disclose stacked pads of adhesive tape strips wherein a first end portion of each individual strip is treated so as to provide a nonadhesive end tab ('706) or an area of reduced adhesion to an adjacent tape strip ('746) at a first end of the pad. The nonadhesive end tab or area of reduced adhesion facilitates initial separation of the first end of an uppermost tape strip from the first end of an immediately underlying tape strip, allowing the uppermost tape strip to be peeled off the pad. While generally effective for dispensing uniform lengths of pressure sensitive adhesive tape, such pads are somewhat cumbersome to use and are not well suited for use in those situations where only one hand is available for dispensing the tape, such as gift wrapping.

Post-it® brand notes and Post-it® brand flags, available from 3M of St. Paul, Minn., require a coating of releasable pressure sensitive adhesive only along one end of the substrate, and can therefore be conveniently dispensed from a container by alternating the adhesive end of the stacked sheets/flags between opposed first and second ends of the stack (e.g., forming a Z-stack of sheets). Such a stack of Post-it® brand flags and associated shuttling dispenser is disclosed in U.S. Pat. No. 4,770,320. Similarly, a pad of W-stacked sheets and associated dispensers are disclosed in U.S. Pat. Nos. 4,416,392, 4,562,938, 4,586,629, and 4,653,666. This alternating style of stacking the sheets/flags is effective because the sheets/flags are adhesively bonded together with a repositionable pressure sensitive adhesive on only one end of the sheet/flag. Such sheets are not suitable for joining or connecting surfaces together because of the relatively small percentages of such sheets coated with adhesive and the low adhesion strength of the pressure sensitive adhesive used with such sheets/flags.

A significant advance in the construction and dispensing of pads of adhesive tape strips is disclosed in U.S. Pat. No. 5,401,547. '547 discloses a pad of superimposed adhesive tape strips wherein the adhesive layer of each tape strip is releasably adhered to an adjacent tape strip at a first adhesion level at a first end and a second adhesion level at a second end (i.e., differential release), and sequential tape strips are longitudinally reversed so as to align the first end of each tape strip with the second end of an immediately overlaying and an immediately underlying tape strip. A preferred manner of achieving such differential release disclosed by '547 is to coat the entire surface area of a first major surface of each strip with a pressure sensitive adhesive and coat the second end portion of the second major surface of each tape strip with a low adhesion backsize (LAB). Such an alternately stacked pad of differential release tape strips can be conveniently dispensed from an associated dispenser with a single hand while maintaining a continuous coating of an aggressive pressure sensitive adhesive on the substrate.

While constituting a significant improvement, the pads disclosed by '547 comply with a specific set of release levels in order to achieve the sliding action required between adjacent tape strips for proper dispensing while preventing fanning of the stacked strips (i.e., preventing the tape strips from accidentally and unintentionally sliding relative to one another before each strip is dispensed). Furthermore, as described in '547, when the differential release requirement is achieved, that portion of the tape strip coated with the premium LAB does not consistently maintain any written indicia.

Accordingly, a substantial need exists for a pad of adhesive tape strips and/or a dispenser for such pads that will provide the convenience of one hand dispensing, provide wider manufacturing parameters, and provide a broader range of release/adhesive systems than the pads of adhesive tape strips disclosed by '547.

SUMMARY OF INVENTION

Briefly, in one aspect of the present invention a dispensing technique is provided for consistently dispensing individual tape strips from a category of W-stacked pads of adhesive tape strips previously believed to be incapable of being dispensed without a high incidence of dispensing failures (i.e., multi-strip dispensing or tail off). Dispensers are also provided that dispense individual tape strips from W-stacked pads of adhesive tape strips using the novel technique and have significantly expanded the types of tape strips capable of being dispensed in the form of a W-stacked pad of tape strips.

For purposes of clarity and without intending to be unduly limited thereby, the tape strips in a group of any three sequentially stacked tape strips are referenced as an overlying tape strip, an intermediate tape strip, and an underlying tape strip with the adhesive layer of the overlying tape strip adhered to the intermediate tape strip, and the adhesive layer of the intermediate tape strip adhered to the underlying tape strip.

The novel technique for dispensing an overlying tape strip from a W-stacked pad of differential release tape strips involves (i) pulling the second longitudinal end of an overlying tape strip away from the pad so as to effect peeling of the overlying tape strip from the intermediate tape strip in a progressive fashion from the second longitudinal end of the overlying tape strip towards the first longitudinal end of the overlying tape strip, (ii) contacting the overlying tape strip so as to restrict the peel angle between the overlying tape strip and the intermediate tape strip to an angle of less than 45° prior to complete separation of the overlying tape strip from the intermediate tape strip and prior to release of a second longitudinal end section of the intermediate tape strip from the underlying tape strip, and then (iii) continuing to pull the overlying tape strip away from the pad to sequentially effect release of the second longitudinal end section of the intermediate tape strip from the underlying tape strip, and complete separation of the overlying tape strip from the intermediate tape strip.

Novel dispensers capable of dispensing a W-stacked pad of adhesive tape strips using the novel dispensing technique described herein comprise (i) a housing defining a retention chamber for holding a W-stacked pad of adhesive tape strips, and having a top with a substantially centrally positioned opening for permitting passage of an adhesively bonded combination of a first longitudinal end portion of an overlaying adhesive tape strip and a second longitudinal end portion of an immediately adjacent intermediate tape strip from a W-stacked pad of adhesive tape strips retained within the retention chamber, and (ii) a means for engaging the overlaying adhesive tape strip as the overlaying adhesive tape strip is dispensed through the opening so as to invariably provide a low peel angle between the overlaying adhesive tape strip and the immediately adjacent intermediate adhesive tape strip at the point of release of the second end portion of the intermediate adhesive tape strip from an adjacent underlying adhesive tape strip. Generally, the engagement means is preferably positioned at both longitudinal ends of the dispenser so as to provide a peel angle of less than 45° with a longitudinal length of at least 0.2 cm of the first longitudinal end portion of the overlaying adhesive tape strip still adhered to the second end portion of the intermediate adhesive tape strip.

The novel W-stacked pads of tape strips capable of being dispensed using the novel technique described herein comprises a plurality of superimposed tape strips wherein (i) sequential tape strips are longitudinally reversed so as to align the first end of each tape strip with the second end of an immediately overlaying and an immediately underlying tape strip, (ii) the adhesive layer of each tape strip adheres the second end portion of each tape strip to the first end portion of an adjacent tape strip at a second adhesion level having an adhesive strength sufficient to prevent any appreciable longitudinal movement of the second end portion of an intermediate tape strip relative to the first end portion of an immediately underlying tape strip when an immediately overlying tape strip is dispensed from the pad at a high peel angle, and (iii) the adhesive layer of each tape strip adheres the first end portion of each tape strip to the second end portion of an adjacent tape strip at a first adhesion level, with (A) the first adhesion level having an adhesive strength greater than about 1½ times the adhesive strength of the second adhesion level, and (B) the first adhesion level having an adhesive strength effective for affording a complete release of the overlying tape strip from the intermediate tape strip after the second end portion of the intermediate tape strip is released from the first end portion of the immediately underlying tape strip and before the intermediate tape strip is completely peeled from the second end portion of the immediately underlying tape strip.

Advantageously, the pads and dispenser(s) of the present invention provide the capabilities of constructing pads that when coated appropriately may provide uniform appearance, which in turn facilitates writable surfaces, gloss control, broader range of LAB and adhesive chemistry systems and the like.

As used herein:

"adhesive strength" means the force required to achieve release of an adhesive from another adjacent surface as measured in accordance with ASTM D3811 ("Unwind Strength");

"adhesive tape strip" means a longitudinally elongated strip of a substrate having first and second opposite major surfaces coated with a continuous or discontinuous layer of an adhesive on the second major surface of the substrate;

"continuous" when used to describe a coating or layer (e.g., LAB coating) means that the coating or layer covers the entire surface area such that the underlying surface (e.g., substrate) is completely covered;

"discontinuous" when used to describe a coating or layer (e.g., LAB, coating), means that the coating or layer is pattern coated (e.g. dot matrix, laterally spaced parallel lines, crosshatching, etc.) and covers less than the entire surface area such that portions of the underlying surface (e.g., substrate) remain exposed;

"dispensed" when used to describe manipulation of an adhesive tape strip, means to grasp the second longitudinal end portion of the adhesive tape strip projecting from the pad and pull the adhesive tape strip so as to peel the adhesive tape strip away from the pad until the full length of the adhesive tape strip detaches from the pad and the first longitudinal end of the adhesive tape strip is separated from the second longitudinal end of the adjacent adhesive tape strip;

"dispensing length" means that portion of the longitudinal length of an, overlaying tape strip still adhered to the second longitudinal end portion of an intermediate tape strip at the time the overlaying tape strip contacts a finger on the dispenser and the peel angle is decreased below 45° and the "dispensing length" is primarily dictated by the longitudinal (length) and transverse (height) positioning of the finger relative to the overlying tape strip on the pad retained within the dispenser;

"release length" means the longitudinal length of an overlaying tape strip still adhered to a second longitudinal end section of an intermediate tape strip at the time the second longitudinal end section of the intermediate tape strip is separated from an underlying tape strip;

"differential release" when used to characterize an adhesive tape strip, means that the longitudinal end portions of the adhesive tape strip adhere to an underlying tape strip at different adhesion levels, such that the force required to separate sequential tape strips is greater at one longitudinal end than at the other longitudinal end;

"tail off" when used to describe faulty dispensing of tape strips from a tape strip pad, refers to those situations where an overlaying tape strip separates from an intermediate tape strip without lifting the second longitudinal end of the intermediate tape strip from an underlying tape strip a distance sufficient to permit the second longitudinal end of the intermediate tape strip to engage the dispenser and remain spaced from the underlying tape strip so as to facilitate subsequent dispensing of the intermediate tape strip and includes both the phenomenon known as "walk off" (i.e., the overlaying tape strip separates from an intermediate tape strip without lifting the second longitudinal end of the intermediate tape strip) and the phenomenon known as "fall back" (i.e., the second longitudinal end of the intermediate tape strip is separated from the underlying tape strip during dispensing of the overlying tape strip, but does not separate far enough to prevent the intermediate tape strip from returning to the pad and re-engaging the underlying tape strip when the overlaying tape strip separates from the intermediate tape strip);

"point of release" means the longitudinal position of the point of departure, when the second longitudinal end of the intermediate tape strip releases from the first longitudinal end of the underlying tape strip;

"peel angle" means the angle between an adhesive tape strip being peeled from the pad and an immediately adjacent tape strip on the pad, measured at the point of departure (i.e., the location along the longitudinal length of the adjacent adhesive tape strips where the strips lose contact with one another)

"high peel angle" means a peel angle of greater than about 45°;

"low peel angle" means a peel angle of less than about 45°, preferably between about 10° and 45°;

"point of departure" means the position along the longitudinal length of adjacent overlying and intermediate adhesive tape strips where the strips lose contact with one another as the overlying tape strip is peeled from the intermediate tape strip; and "W-stacked pad of adhesive tape strips" means a pad of superimposed differential release adhesive tape strips with the adhesive layer of each tape strip releasably adhered to an adjacent tape strip and sequential tape strips longitudinally reversed so as to align the first end of each tape strip with the second end of an immediately overlaying and an immediately underlying tape strip, whereby the adhesive layer of each tape strip adheres the second end portion of each tape strip to the first end portion of an adjacent tape strip at a second adhesion level and adheres the first end portion of each tape strip to the second end portion of an adjacent tape strip at a first adhesion level.

DESCRIPTION OF THE PREFERRED EMBODIMENT(S)

Individual Tape Strips

Substrate

Figure 1A:
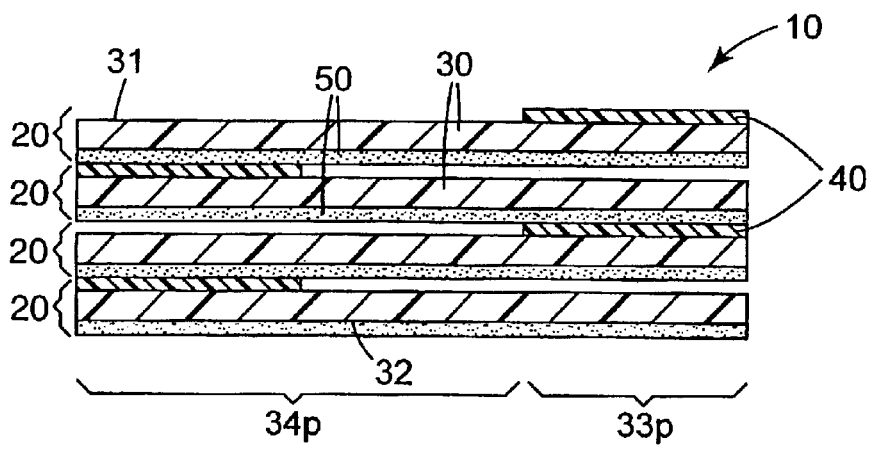
FIG. 1A is a sectional side view of a first embodiment of the tape strip pad according to the present invention wherein differential release is effected by a LAB coating on the first end portion of the tape strips.

The substrate 30 is preferably rectangular in shape with a longitudinal length of about 3 to 10 cm and a lateral width of about 1 to 4 cm. Tape strips 20 within these dimensions accommodate most practical uses of such tape strips 20. Other shapes may also be employed, including specifically, but not exclusively, square, circular, triangular, and polygonal shapes.

Substrates 30 suitable for use in construction of the adhesive tape strips 20 include substantially any flat, flexible material having the necessary structural integrity. Suitable materials include (i) polymeric films of brightened acetate, unbrightened acetate, thermosets, thermoplastics such as polyester, polypropylene, land vinyl polymers, (ii) paper, and (iii) metal foil. Various laminated combinations of such materials may also be used. For many applications, the substrate 30 is preferably transparent so that the surfaces connected or joined by the adhesive tape strip 20 may be seen through the tape strip 20.

An acetate film suitable for use as the substrate 30 is described in U.S. Pat. No. 2,927,868.

LAB

The first major surface 31 of the substrate 30 is coated with LAB LAB 40. As shown in FIG. 1B, a preferred embodiment of the tape strips 20 has a first end portion 33p coated with a superior release LAB 40s and a second end portion 34p coated with a basic LAB 40b, both of which are writeable (i.e., ink receptive).

LAB refers to a material capable of readily releasing from a layer of a pressure sensitive adhesive. A number of materials suitable for use as a LAB are known to those skilled in the art, including specifically, but not exclusively silicones, fluorocarbons, acrylates, urethanes, chrome complexes, grafted and block siloxane hydrocarbons, and blends of these materials. Specific examples of suitable LAB compositions are described in U.S. Pat. Nos. 4,279,717, 4,421,904 and 4,313,900. Other materials suitable for use as the LAB according to the present invention are described in U.S. Pat. Nos. 2,532,011, 2,607,711 and 2,607,711.

Adhesive

The second major surface 32 of the substrate 30 is coated with a pressure sensitive adhesive 50. The layer of pressure sensitive adhesive 50 is preferably uniform over the entire surface of the substrate 30 and formed from a single type of adhesive having an adhesion to glass of greater than about 10 ounces per inch (11 grams/millimeter).

The pressure sensitive adhesive 50 may be selected from any of the known pressure sensitive adhesives, including acrylic, silicone, and rubber-resin pressure sensitive adhesives. By way of example, the pressure sensitive adhesive 50 may be an acrylic adhesive comprised of isooctyl acrylate (IOA) and acrylic acid (AA). Adhesives suitable for use with the present invention are described in U.S. Pat. Nos. 2,926, 105, 3,331,729, 3,578,622, 4,835,217 and 4,699,842. Repositionable adhesives, such as the acrylate-based microsphere adhesives disclosed in U.S. Pat. No. 3,691,140, are also suitable for use as the adhesive 50 in accordance with the present invention.

Primer

The first 31 and/or second 32 major surfaces of the substrate 30 may optionally include a primer layer (not shown) between the substrate 30 and the 30 corresponding layer of LAB 40 and/or adhesive 50 for purposes of enhancing adhesion of the LAB 40 and/or adhesive 50 to the substrate 30. Substantially any of the known primers may be satisfactorily used in the present invention without affecting performance of the LAB 40 or the adhesive 50. Alternatively, the substrate 30 may be corona or flame treated.

Pad of Adhesive Tape Strips

Referring generally to FIGS. 1A through 1G, a plurality (e.g. 10 to 250, generally 20 to 100) of the individual tape strips 20 are stacked and aligned to form a pad 10 of the adhesive tape strips 20 with the coating of pressure sensitive adhesive 50 on each tape strip 20 adhering the tape strip 20 to an immediately adjacent tape strip 20. Sequential tape strips 20 are longitudinally reversed so as to align the first end 33 of each tape strip 20 with the second end 34 of an a immediately overlaying and an immediately underlying tape strip 20. A supportive backing 70 may be adhesively bonded to the second major surface 32 of the lowermost tape strip 29.

For purposes of clarity and without intending to be unduly limited thereby, a group of any three sequentially stacked tape strips 20 in the pad 10 shall hereinafter be referenced as a "dispensing set" of tape strips 20 with the tape strip 20 having an exterior facing first major surface 31 (i.e., the surface coated with LAB 40) referenced as the overlaying tape strip 25o, the tape strip 20 having an exterior facing second major surface 32 (i.e., the surface coated with adhesive 50) referenced as the underlying tape strip 25u, and the tape strip sandwiched between the overlaying 25o and the underlying 25u tape strips referenced as the intermediate tape strip 25i.

The tape strips 20 are constructed to provide a differential release between a first longitudinal end portion 33p and a second longitudinal end portion 34p of each tape strip 20, with the adhesive 50 on the first end portion 33p of each tape strip 20 adhering to the second end portion 34p of an adjacent tape strip 20 at a first (higher) adhesion level and the adhesive 50 on the second end portion 34p of each tape strip 20 adhering to the first end portion 33p of an adjacent tape strip 20 at a second (lower) adhesion level.

The adhesive layer 50 of each tape strip 20 adheres the second longitudinal end portion 34p of each tape strip 20 to the first longitudinal end portion 33p of an adjacent tape strip 20 at a second adhesion level having an adhesive strength sufficient to prevent any appreciable longitudinal movement of the second longitudinal end portion 34p of an intermediate tape strip 25i relative to the first longitudinal end portion 33p of an immediately underlying tape strip 25u when an immediately overlying tape strip 25o is dispensed from the pad 10 at a high peel angle. Comparatively, the adhesive layer 50 of each tape strip 20 adheres the first longitudinal end portion 33p of each tape strip 20 to the second longitudinal end portion 34p of an adjacent tape strip 20 at a first adhesion level wherein the first adhesion level is greater than the second adhesion level and has an adhesive strength effective for affording a complete release of the overlying tape strip 25o from the intermediate tape strip 25i after the second longitudinal end portion 34p of the intermediate tape strip 25i is released from the first longitudinal end portion 33p of the immediately underlying tape strip 25u and before the intermediate tape strip 25i is completely peeled from the second longitudinal end portion 34p of the immediately underlying tape strip 25u.

Figure 1B:
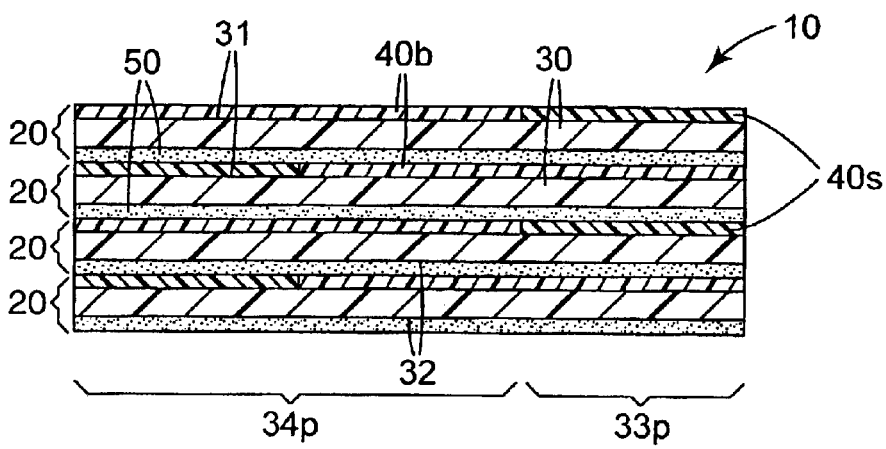
FIG. 1B is a sectional side view of a second embodiment of the tape strip pad according to the present invention wherein differential release is effected by a basic LAB coating over the second end portion of the first major surface of the substrate and a superior release LAB coating over the basic LAB coating on the first end portion of the tape strips.

A first embodiment of a differential release tape strip pad 10 according to the present invention is shown in FIG. 1A. The individual tape strips 20 include a coating of a LAB over only a first end portion 33p of the first major surface 31 of the substrate 30 and a coating of a pressure sensitive adhesive 50 over the entire second major surface 32 of the substrate 30. The tape strips 20 are stacked with the LAB coated first end portion 33p of successive strips 20 disposed at opposite longitudinal ends of the pad 10 to form a W-stacked pad 10 of adhesive tape strips 20. The substrate 30, LAB 40 and adhesive 50 should be selected and coated so as to provide a first (higher) adhesive level between the adhesive 50 of a first tape strip 20 and the substrate 30 of a second tape strip 20, and a second (lower) adhesive level between the adhesive 50 of the first tape strip 20 and the LAB coating 50 of the second tape strip 20.

Figure 2A:
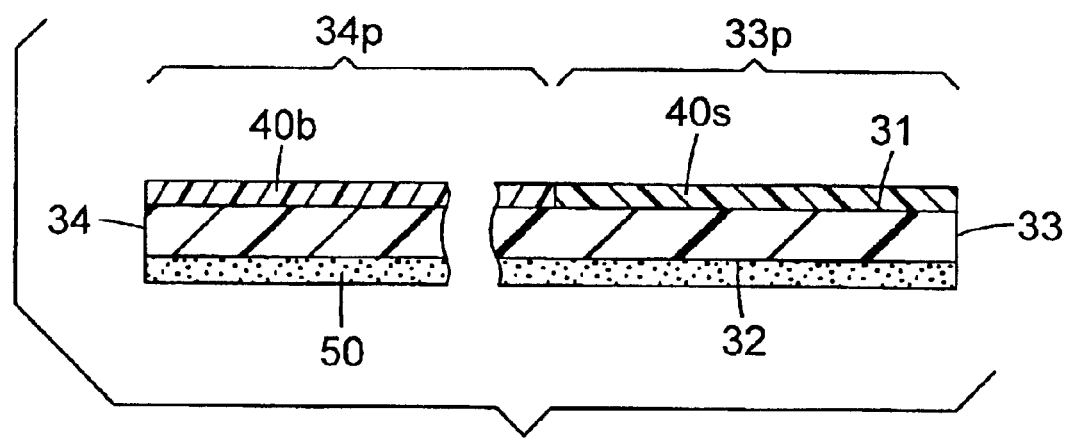
FIG. 2A is an enlarged sectional side view of a single tape strip as shown in FIG. 1B.

A second embodiment of a differential release tape strip pad 10 according to the present invention is shown in FIG. 1B. The individual tape strips 20, shown in FIG. 2A, include a coating of a superior release LAB 40s over a first end portion 33p of the first major surface 31 of the substrate 30, a coating of a basic LAB 40b over a second end portion 34p of the first major surface 31 of the substrate 30, and a coating of a pressure sensitive adhesive 50 over the entire second major surface 32 of the substrate 30. The tape strips 20 are stacked with the superior release LAB coated first end portion 33p of successive strips 20 disposed at opposite longitudinal ends of the pad 10 to form a W-stacked pad 10 of adhesive tape strips 20. The superior release LAB 40s, basic LAB 40b and adhesive 50 are selected and coated to provide a first (higher) adhesive level between the adhesive 50 of a first tape strip 20 and the basic LAB 40b of a second tape strip 20, and a second (lower) adhesive level between the adhesive 50 of the first tape strip 20 and the superior release LAB coating 40s of the second tape strip 20. Alternatively, the tape strips 20 used to form the second embodiment of the tape strip pad 10 can be constructed by coating the entire first major surface 31 of the substrate 30 with the basic LAB 40b and then coating the first end portion 33p of the substrate 30 with a superior release LAB 40s over the basic LAB 40b.

Figure 1C:
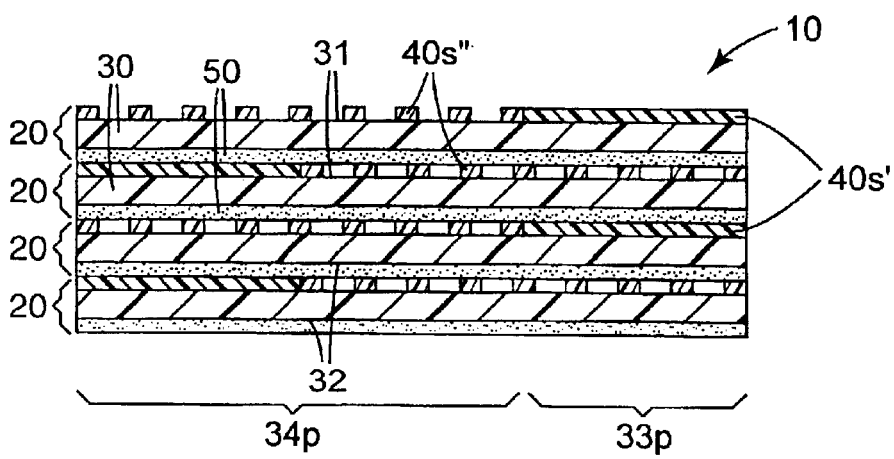
FIG. 1C is a sectional side view of a third embodiment of the tape strip pad according to the present invention wherein differential release is effected by a continuous coating of a LAB on the first end portion of the tape strips and a discontinuous coating of a LAB on the second end portion of the tape strips.

A third embodiment of a differential release tape strip pad 10 according to the present invention is shown in FIG. 1C. The individual tape strips 20 include a continuous coating of a superior release LAB 40s' over a first end portion 33p of the first major surface 31 of the substrate 30, a discontinuous coating of the superior release LAB 40s" over a second end portion 34p of the first major surface 31 of the substrate 30 so as to form a pattern coating of the superior release LAB 40s", and a coating of a pressure sensitive adhesive 50 over the entire second major surface 32 of the substrate 30. The tape strips 20 are stacked with the continuously coated first end portion 33p of successive strips 20 disposed at opposite longitudinal ends of the pad 10 to form a W-stacked pad 10 of adhesive tape strips 20. The substrate 30, superior release LAB 40s, and adhesive 50 are selected and pattern coated to provide a first (higher) adhesive level between the adhesive 50 of a first tape strip 20 and the longitudinal end portion of a second tape strip 20 discontinuously coated with superior release LAB 40s", and a second (lower) adhesive level between the adhesive 50 of the first tape strip 20 and the longitudinal end portion of the second tape strip 20 continuously coated with superior release LAB 40s'.

Figure 1D:
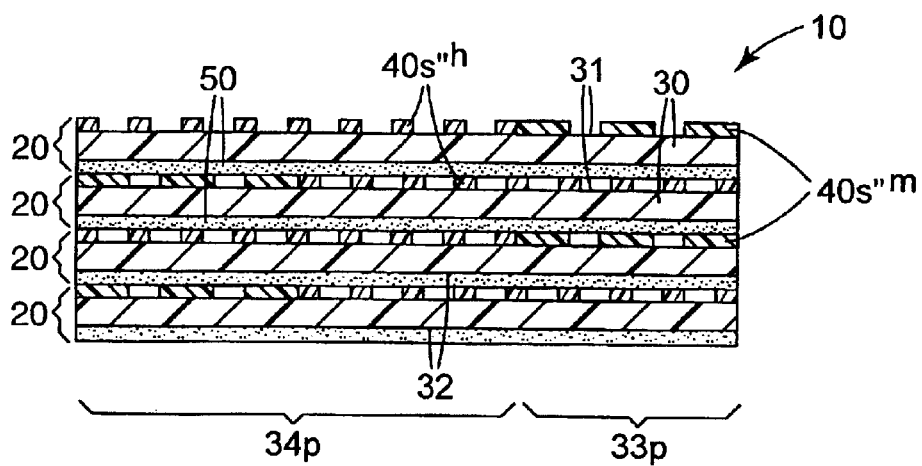
FIG. 1D is a sectional side view of a fourth embodiment of the tape strip pad according to the present invention wherein differential release is effected by a moderately discontinuous coating of a LAB on the first end portion of the tape strips and a highly discontinuous coating of a LAB on the second end portion of the tape strips.

A fourth embodiment of a differential release tape strip pad 10 according to the present invention is shown in FIG. 1D. The fourth embodiment is substantially the same as the third embodiment shown in FIG. 1C except that the coating of superior release LAB 40s is moderately discontinuous 40s"$^m$ over a first end portion 33p of the first major surface 31 of the substrate 30, and highly discontinuous 40s"$^m$ over a second end portion 34p of the first major surface 31 of the substrate 30.

Figure 1E:
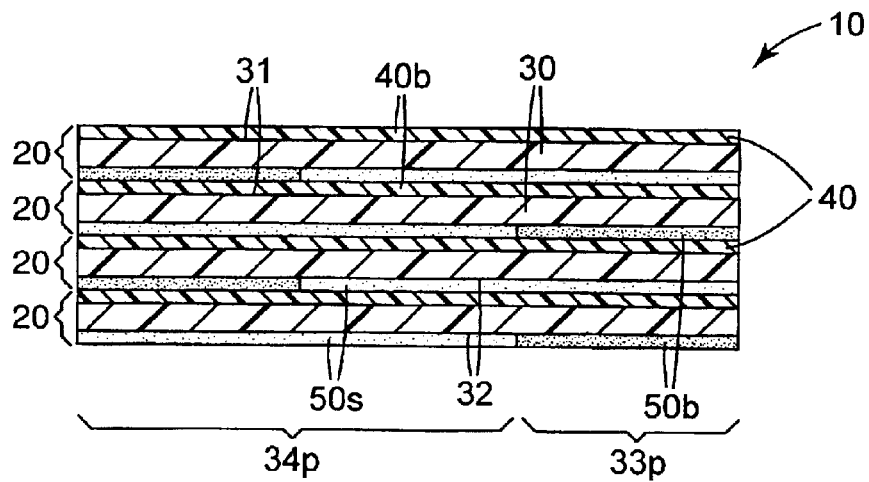
FIG. 1E is a sectional side view of a fifth embodiment of the tape strip pad according to the present invention wherein differential release is effected by a coating of an adhesive having a first adhesion level on the first end portion of the tape strips and a coating of an adhesive having a second adhesion level on the second end portion of the tape strips.
Figure 2B:
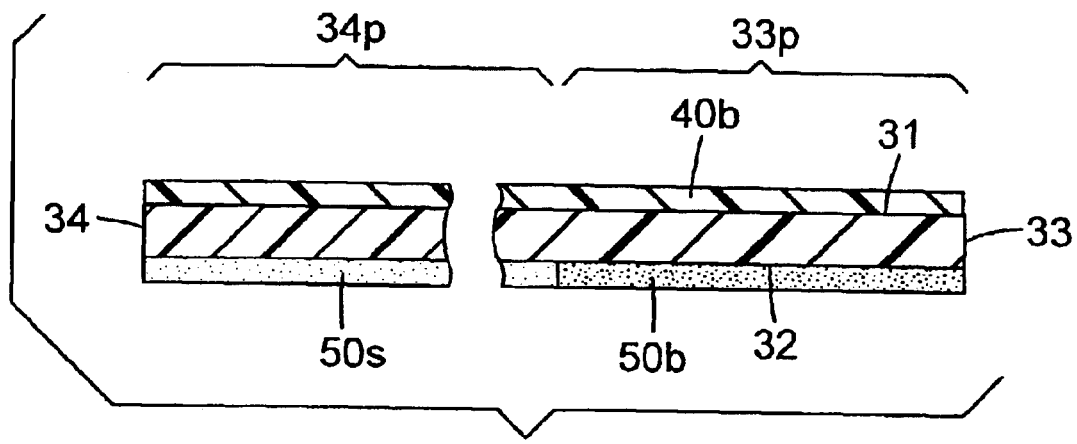
FIG. 2B is an enlarged sectional side view of a single tape strip as shown in FIG. 1E.

A fifth embodiment of a differential release tape strip pad 10 according to the present invention is shown in FIG. 1E. The fifth embodiment is similar to the second embodiment except that the differential release is obtained by coating different adhesives 50 onto the substrate 30 rather than different low adhesion backsides 40. As shown in FIGS. 1E and 2B, the individual tape strips 20 include a coating of a superior release adhesive 50s over a second end portion 34p of the second major surface 32 of the substrate 30, a coating of a basic release adhesive. 50b over a first end portion 33p of the second major surface 32 of the substrate 30, and a coating of a LAB 40 over the entire first major surface 31 of the substrate 30. The tape strips 20 are stacked with the superior release adhesive coated second end portion 34p of successive strips 20 disposed at opposite longitudinal ends of the pad 10 to form a W-stacked pad 10 of adhesive tape strips 20. The superior release adhesive 50s, basic release adhesive 50b and LAB 40 are selected and coated to provide a first (higher) adhesive level between the basic release adhesive 50b of a first tape strip 20 and the LAB coating 40 of a second tape strip 20, and a second (lower) adhesive level between the superior release adhesive 50s of the first tape strip 20 and the LAB coating 40 of the second tape strip 20.

Figure 1F:
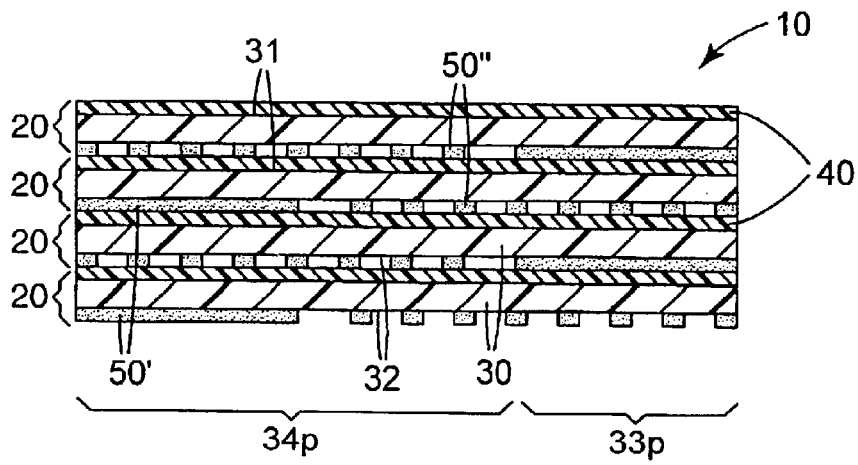
FIG. 1F is a sectional side view of a sixth embodiment of the tape strip pad according to the present invention wherein differential release is effected by a continuous coating of an adhesive on the first end portion of the tape strips and a discontinuous coating of an adhesive on the second end portion of the tape strips.

A sixth embodiment of a differential release tape strip pad 10 according to the present invention is shown in FIG. 1F. The sixth embodiment is similar to the third embodiment except that the differential release is obtained by continuously coating the adhesive 50' on the first end portion 33p of the substrate 30 and discontinuously coating the same adhesive 50" on the second end portion 34p of the substrate 30, rather than continuously and discontinuously coating the LAB 40. The individual tape strips 20 include a continuous coating of adhesive 50' over a first end portion 33p of the second major surface 32 of the substrate 30, a discontinuous coating (i.e., pattern coating) of the adhesive 50" over a second end portion 34p of the second major surface 32 of the substrate 30, and a coating of a LAB 40 over the entire first major surface 31 of the substrate 30. The tape strips 20 are stacked with the continuously coated first end portion 33p of successive strips 20 disposed at opposite longitudinal ends of the pad 10 to form a W-stacked pad 10 of adhesive tape strips 20. The LAB 40, and adhesive 50 are selected and pattern coated to provide a first (higher) adhesion level between the longitudinal end portion of a first tape strip 20 continuously coated with adhesive 50' and the LAB 40 on a second tape strip 20, and a second (lower) adhesive level between the longitudinal end portion of a first tape strip 20 discontinuously coated with adhesive 50" and the LAB 40 on the second tape strip 20.

Figure 1G:
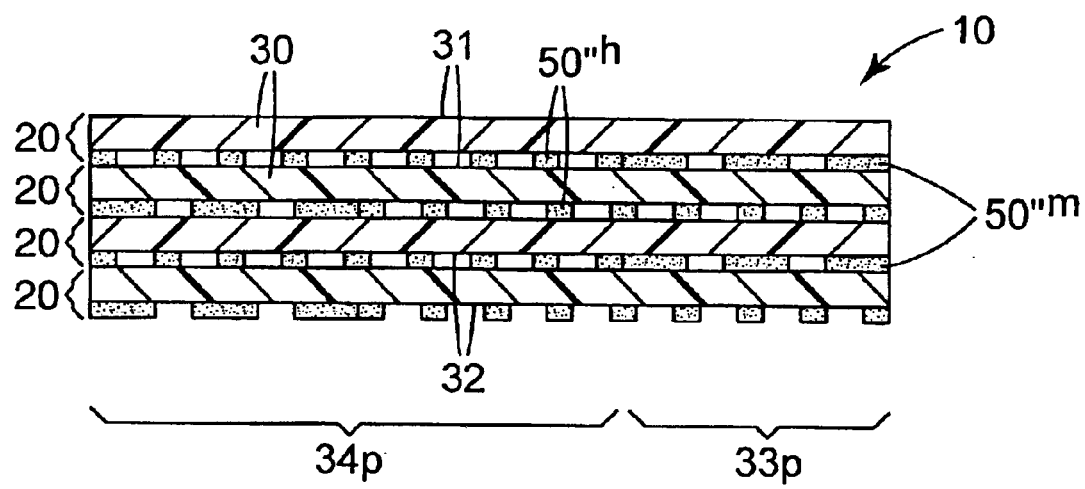
FIG. 1G is a sectional side view of a seventh embodiment of the tape strip pad according to the present invention wherein differential release is effected by a moderately discontinuous coating of an adhesive on the first end portion of the tape strips and a highly discontinuous coating of an adhesive on the second end portion of the tape strips.

A seventh embodiment of a differential release tape strip pad 10 according to the present invention is shown in FIG. 1G. The seventh embodiment is similar to the fourth embodiment except that the differential release is obtained by providing a moderately discontinuous coating of adhesive 50"$^m$ on the first end portion 33p of the substrate 30 and a highly discontinuous coating of the same adhesive 50"$^h$ on the second end portion 34p of the substrate 30 rather than varying the discontinuity of the LAB 40. The seventh embodiment is also substantially the same as the sixth embodiment shown in FIG. 1F except that the coating of adhesive 50 is highly discontinuous 50"$^h$ over a second end portion 34p of the second major surface 32 of the substrate 30, and moderately discontinuous 50"$^m$ over a first end portion 33p of the second major surface 32 of the substrate 30.

It is also possible to construct a differential release tape strip pad 10 according to the present invention by combining changes in the type and/or coating pattern of both the LAB 40 and the pressure-sensitive adhesive 50.

For purposes of clarity and without intending to be unduly limited thereby, the balance of the disclosure directed to construction of the tape strip pad 10 and dispensing of individual tape strips 20 from the tape strip pad 10 shall be based upon the second embodiment of the tape strip pad 10 shown in FIG. 1B (i.e., differential release is effected by coating a superior release LAB 40s on a first longitudinal end portion 33p of the tape strip 20 and a basic LAB 40b on the second longitudinal end portion 34p of the tape strip 20) unless otherwise stated.

In order to consistently provide the dispensing of a single tape strip 20 using a shear dispenser 100, the second (lower) adhesion level should provide an adhesive strength of less than 160 grams per inch and the first (higher) adhesion level should provide an adhesive strength of at least about 100 grams per inch, with a ratio of the first (higher) adhesion level and the second (lower) adhesion level at least 1.5:1. A second (lower), adhesion level of greater than about 160 grams per inch can cause tail off (i.e., an overlaying tape strip 25o is dispensed from the tape strip pad 10 before the second end 34 of an intermediate tape strip 25i is separated from the first end 33 of an underlying tape strip 25u a sufficient distance for the; second end 34 of the intermediate tape strip 25i to engage the dispenser 100).

The area of the first longitudinal end portion 33p of each tape strip 20 is the product obtained by multiplying the lateral width "z" (not shown) of the tape strip 20 by the longitudinal length of that portion of the tape strip 20 constructed so as to adhere to an adjacent tape strip 20 at the second (lower) adhesion level. Similarly, the area of the second longitudinal end portion 34p of each tape strip 20 is the product obtained by multiplying the lateral width "z" of the tape strip 20 by the longitudinal length of that portion of the tape strip 20 constructed so as to adhere to an adjacent tape strip 20 at the first (higher) adhesion level.

While the relative areas of the first 33p and second 34p longitudinal end portions of the tape strips 20 effective for invariably producing the desired lifting of the second end portion 34p of an intermediate tape strip 25i when an overlaying tape strip 25o is dispensed from the pad 10 (hereinafter "sequential dispensing effect") depends upon a number of factors, such as the actual adhesive strengths of the first (higher) and second (lower) adhesion levels and the peel angle α used, when dispensing the overlaying tape strip 25o, as a general rule a first longitudinal end portion 33p of about 2 to 4 cm comprising about 10 to 80% of the area of the tape strip 20 consistently achieves the desired sequential dispensing effect without tail off.

Correspondingly, as a general rule a second longitudinal end portion 34p of about 2 to 10 cm comprising about 20 to 90% of the area of the tape strip 20 consistently achieves the desired sequential dispensing effect without tail off.

A preferred embodiment of the tape strip 20 has a first longitudinal end portion 33p covering about ⅓ of the surface area of the tape strip 20 and a second longitudinal end portion 34p covering about ⅔ of the surface area of the tape strip 20.

Dispenser

Referring generally to FIGS. 4A through 4D, there is shown a first embodiment of a dispenser 100 according to the present invention. The dispenser 100 is effective for dispensing adhesive tape strips 20 from a pad 10 of the tape strips as described herein.

Figure 4A:
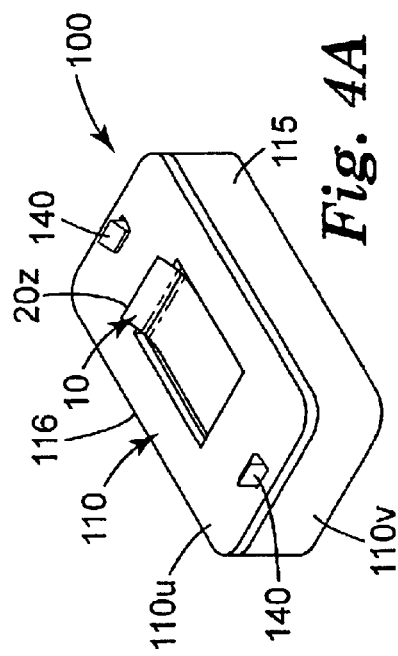
FIG. 4A is a perspective view of a first embodiment of the tape strip pad dispenser according to the present invention.

The dispenser 100 includes a housing 110 formed from an upper portion 110u and a lower portion 110v releasably connected by an upwardly extending shoulder post 140 proximate each longitudinal end (unnumbered) of the lower portion 110v. The shoulder posts 140 are positioned to extend through a pair of slightly offset orifices 118 in the upper portion 110u. Each shoulder post 140 has a shoulder 141 configured and arranged to engage the upper surface (unnumbered) of the upper portion 110u once the shoulder posts 140 have passed through the corresponding offset orifice 118 so as to releasably lock the upper portion 110u into position against the lower portion 110v. The housing 110 formed from the upper 110u and lower 110v portions includes a top 111, a bottom 112, a first longitudinal end 113, a second longitudinal end 114, a first sidewall 115 and a second sidewall 116. The housing 110 defines a retention chamber 117 having a longitudinal length 117x, a lateral width 117z and a transverse height 117y effective for retaining the pad 10 of adhesive tape strips 20. A centrally positioned opening 119 is provided through the top 111 of the housing 110 having a size and shape effective for permitting dispensing of individual tape strips 20 from a pad 10 of the tape strips 20 retained within the retention chamber 117. The opening 119 effectively separates the top 111 of the housing 110 into a first longitudinal end 113 having a first distal edge 113d and a second longitudinal end 114 having a second distal edge 114d wherein the distal edges 113d and 114d are longitudinally positioned so as to be effective for contacting and supporting the second longitudinal end 34 of a partially dispensed adhesive tape strip 20 above the pad 10 of adhesive tape strips 20 as shown in FIGS. 4A and 4B.

Figure 4B:
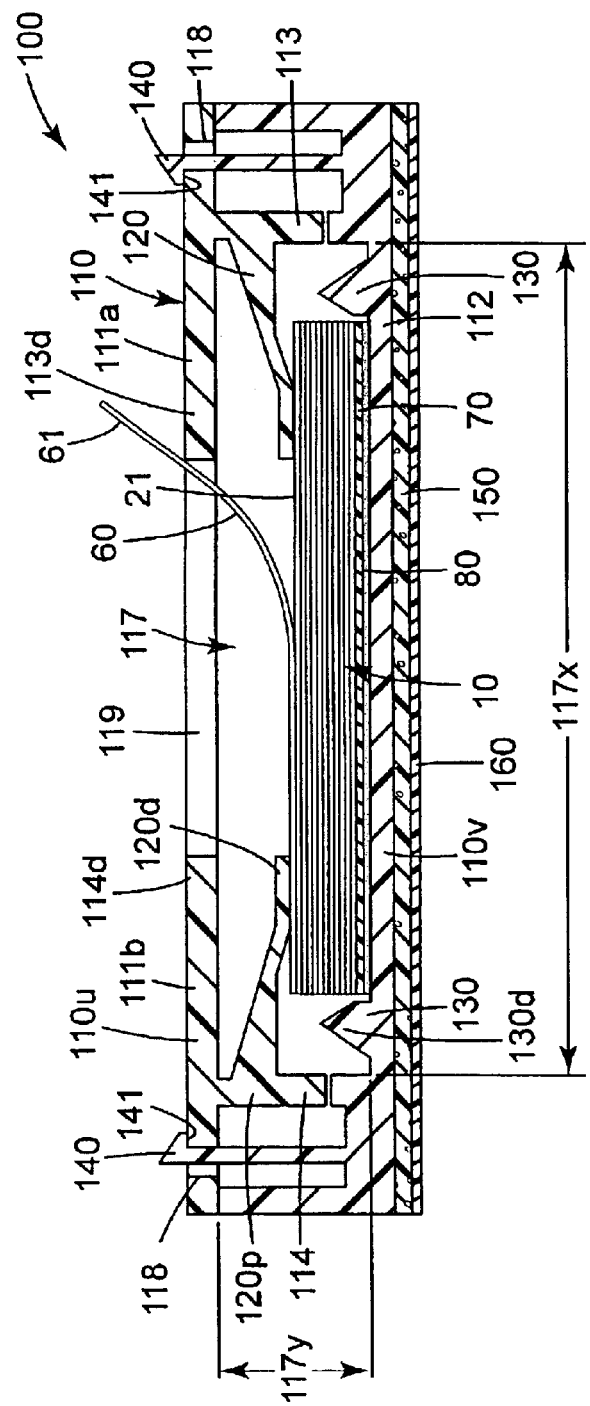
FIG. 4B is a sectional side view of the tape strip pad dispenser shown in FIG. 4A wherein the second end of the leader strip is supported in a dispensing position by the top of the dispenser housing.
Figure 4C:
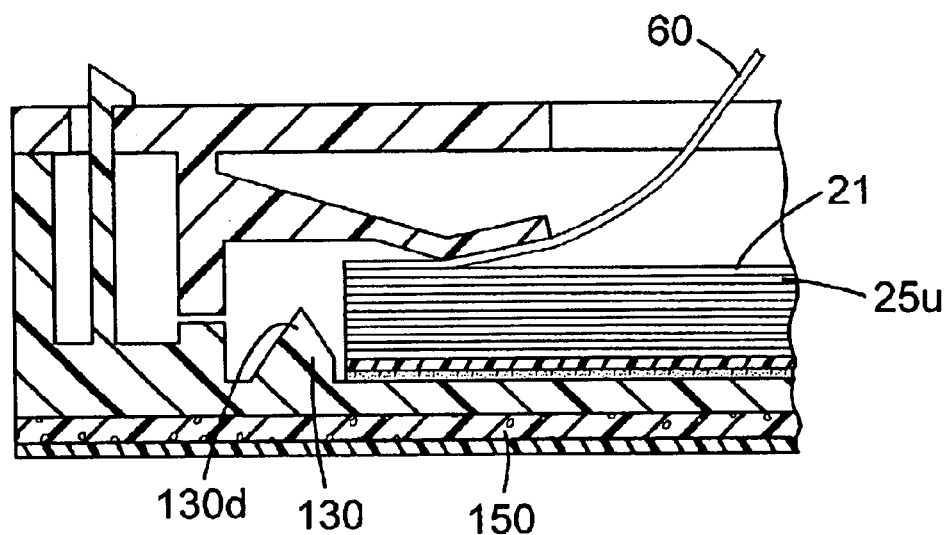
FIG. 4C is a sectional side view of the tape strip pad dispenser as shown in FIG. 4B wherein the leader strip has been partially dispensed from the tape strip pad and has engaged the engagement means.
Figure 4D:
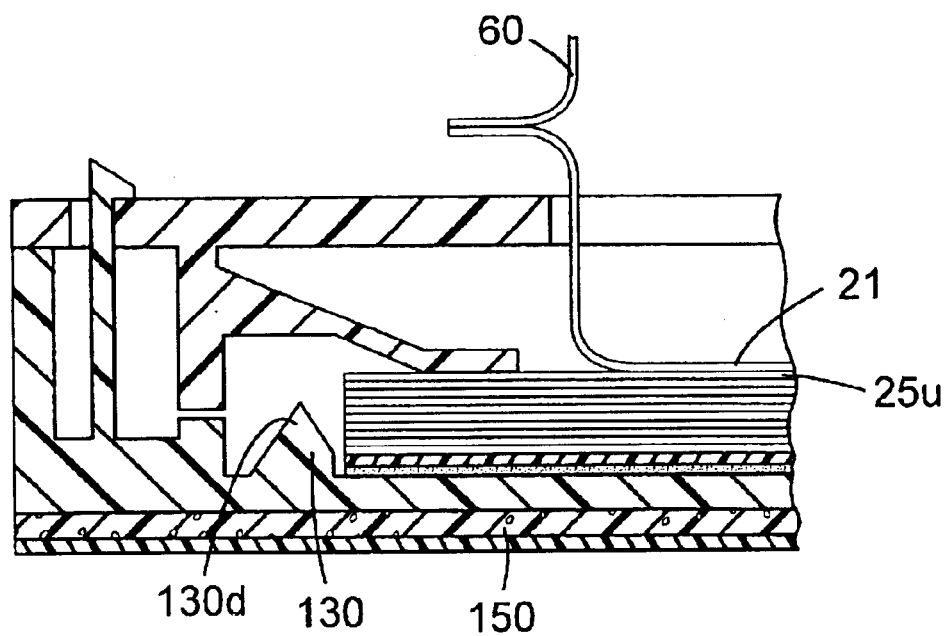
FIG. 4D is a sectional side view of the tape strip pad dispenser as shown in FIG. 4C wherein the leader strip has been dispensed from the tape strip pad but remains attached to the second end of the uppermost tape strip which has been peeled from the first end of the underlying tape strip.
Figure 4E:
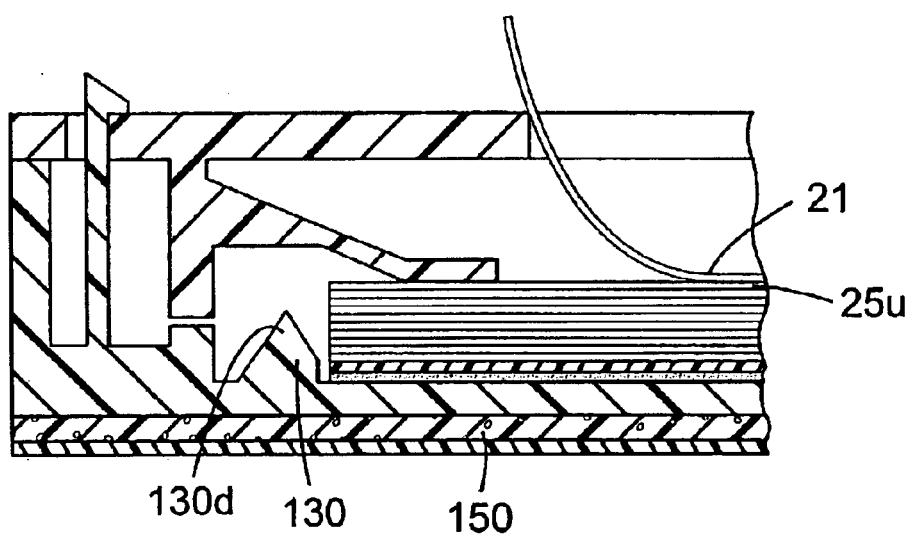
FIG. 4E is a sectional side view of the tape strip pad dispenser as shown in FIG. 4D wherein the leader strip has been fully detached from the uppermost tape strip and the second end of the uppermost tape strip is supported in a dispensing position by the top of the dispenser housing.

As shown in FIG. 4B, a plurality of guide nubs 130 extend upward from the bottom 112 of the housing 110 around the periphery of an area (unnumbered) adapted to receive the pad 10 of adhesive tape strips 20. The distal end 130d of the nubs 130 can be beveled towards the receiving area (unnumbered) for guiding the pad 10 into proper position.

Figure 3:
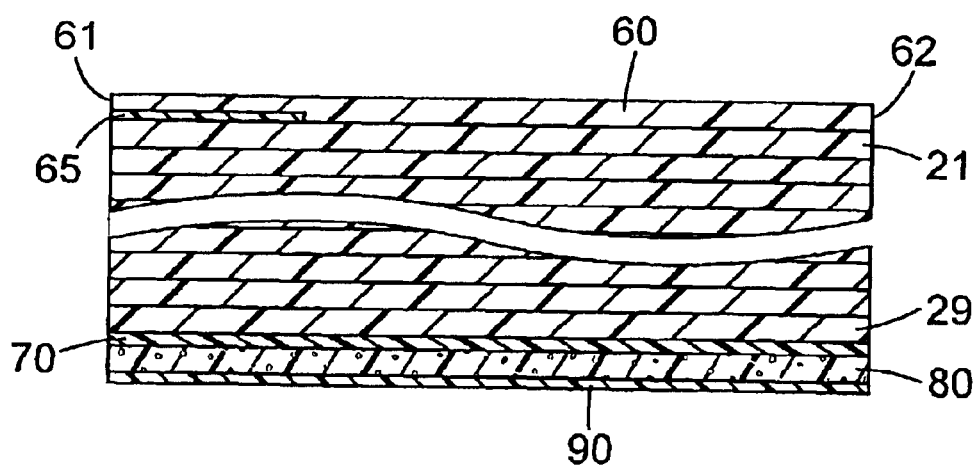
FIG. 3 is a simplified side view of the tape strip pad shown in FIG. 1B including a leader strip.

As shown in FIGS. 3 and 4B, a length of double-faced adhesive tape 80 is provided between the backing 70 on the pad 10 of tape strips 20 and the bottom 112 of the housing 110 for securing the pad 10 into position within the retention chamber 117 (i.e., the pad 10 does not move within the retention chamber 117 during dispensing of individual tape strips 20 from the pad 10). As shown in FIG. 3, the exposed surface (unnumbered) of the double-faced adhesive tape 80 is covered with a release liner 90 prior to insertion of the pad 10 into the dispenser 100. The double-faced adhesive tape 80 may be eliminated in certain embodiments so long as a low peel angle α can be maintained during dispensing of individual tape strips 20 from the pad 10 even though the pad 10 is permitted to move longitudinally 117x and/or transversely 117y and/or laterally "z" (not shown) within the retention chamber 117.

Similarly, as shown in FIG. 4B, a length of double-faced adhesive tape 150 can be provided on the exterior surface (unnumbered) of the bottom 112 of the housing 110 for securing the dispenser 100 onto a surface (e.g., a desk top) for permitting one-handed dispensing (i.e., a tape strip 20 can be dispensed from the dispenser 100 without restraining the dispenser 100 with the other hand). The exposed surface (unnumbered) of the double-faced adhesive tape 150 is covered with a release liner 160. Alternatively, a magnet (not shown) or a weighted base (not shown) can be used to hold down the dispenser 100.

As shown in FIGS. 4A–4F, a low peel angle α is ensured by a downwardly biased finger 120 extending from each longitudinal end 113 and 114 of the upper portion 110u of the housing 110. The fingers 120 are configured to engage a partially dispensed overlaying tape strip 25o proximate the longitudinal end still adhered to an intermediate tape strip 25i (i.e., proximate the first end 33 of the overlaying tape strip 25o) and provide a downward biasing force sufficient to maintain a low peel angle α when the overlaying tape strip 25o is dispensed, throughout the entire thickness of the pad 10. In order to ensure that the overlaying tape strip 25o is dispensed at a low peel angle α, a transverse gap should be provided between the distal end 120d of the finger 120 and the point of departure when the point of release is reached. This transverse gap is provided in the embodiment shown in FIGS. 4A–F by constructing the fingers 120 so that they flex upward during dispensing of the overlaying tape strip 25o before the point of release is reached. Failure to provide such a transverse gap between the distal end 120d of the finger 120 and the point of departure when the point of release is reached permits the peel angle α to be dictated primarily by the angle at which the user pulls the overlaying tape strip 25o from the pad 10 (i.e., pulling straight up on the overlaying tape strip 25o relative to the pad 10 would effect dispensing of the overlaying tape strip 25o at an unacceptable peel angle α of approximately 90° depending upon any restrictions on peel angle α imposed by the size and positioning of the central opening 119).

Figure 4F:
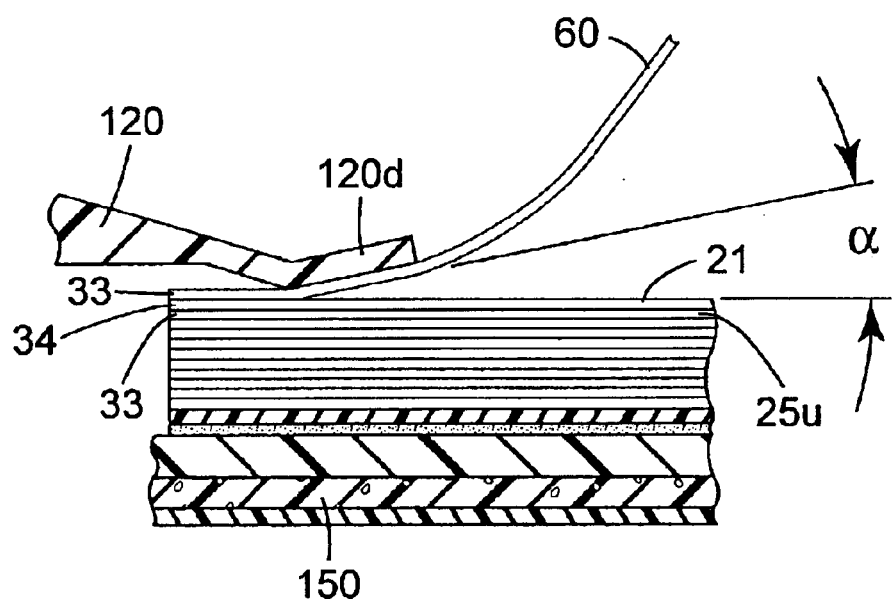
FIG. 4F is an enlarged sectional side view of the biased finger as shown in FIG. 4C.
Figure 5A:
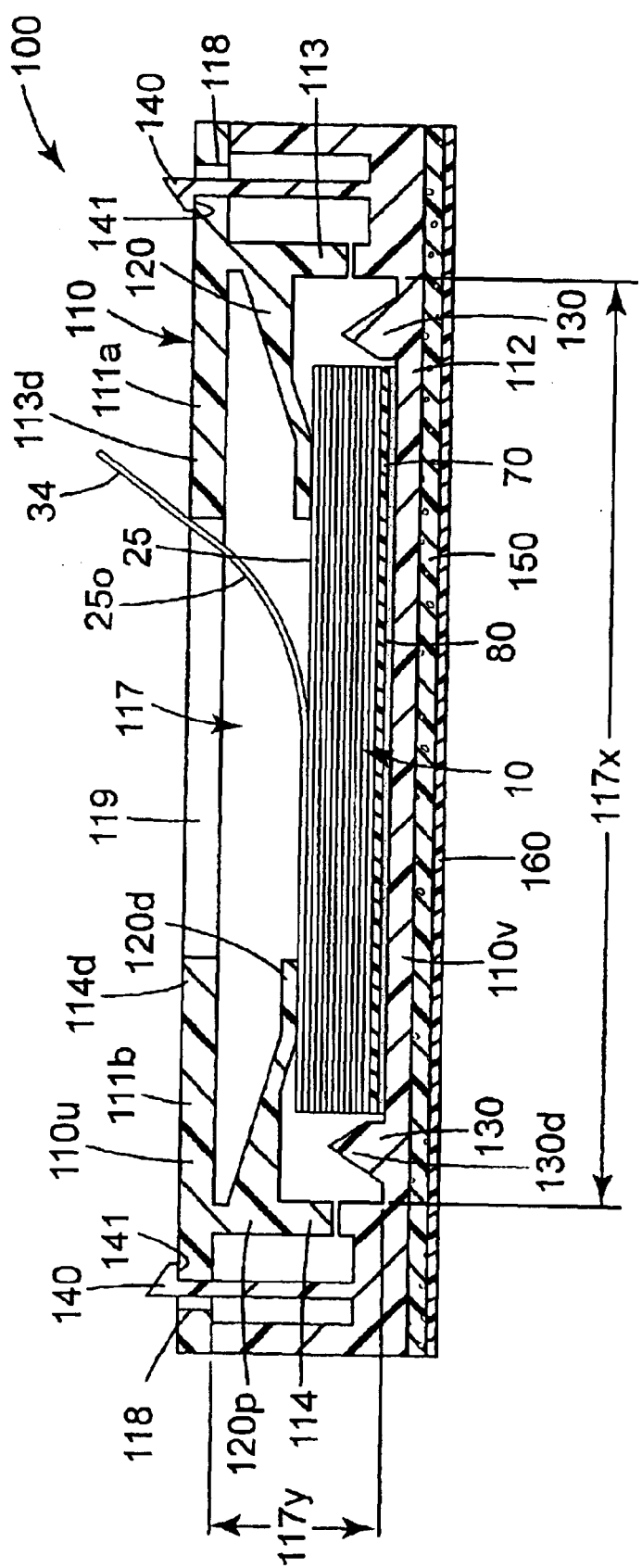
FIG. 5A is a sectional side view of the tape strip pad dispenser shown in FIG. 4A wherein the second end of the overlaying tape strip is supported in a dispensing position by the top of the dispenser housing.
Figure 5B:
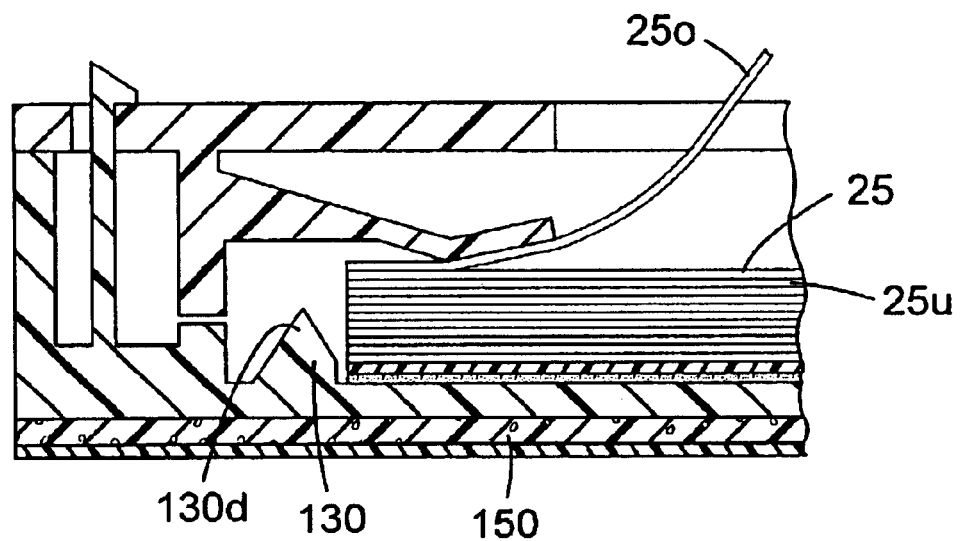
FIG. 5B is a sectional side view of the tape strip pad dispenser as shown in FIG. 5A wherein the overlaying tape strip has been partially dispensed from the tape strip pad and has engaged the engagement means.
Figure 5C:
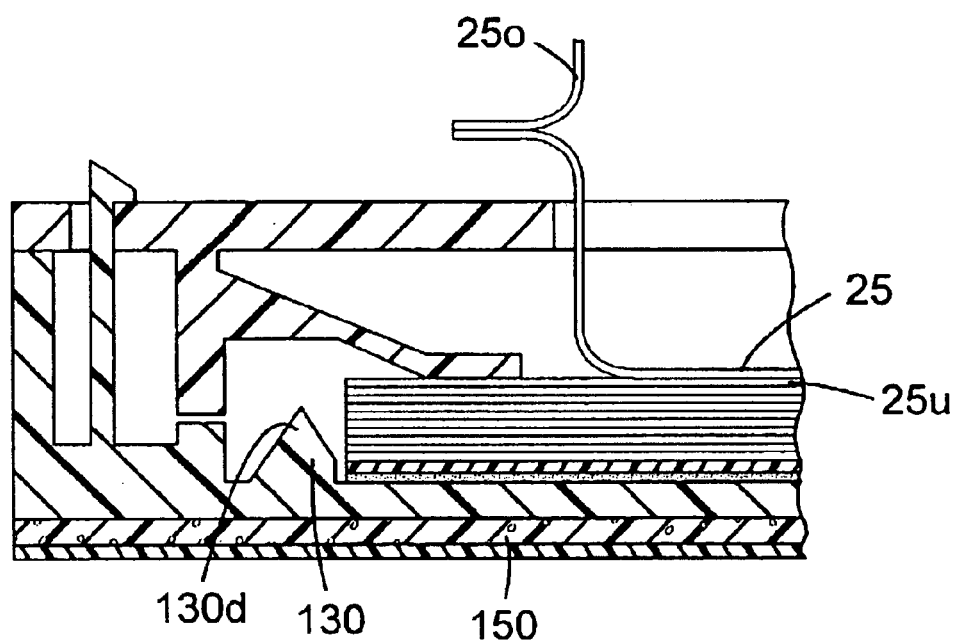
FIG. 5C is a sectional side view of the tape strip pad dispenser as shown in FIG. 5B wherein the overlaying tape strip has been dispensed from the tape strip pad but remains attached to the second end of the intermediate tape strip which has been peeled from the first end of the underlying tape strip.
Figure 5D:
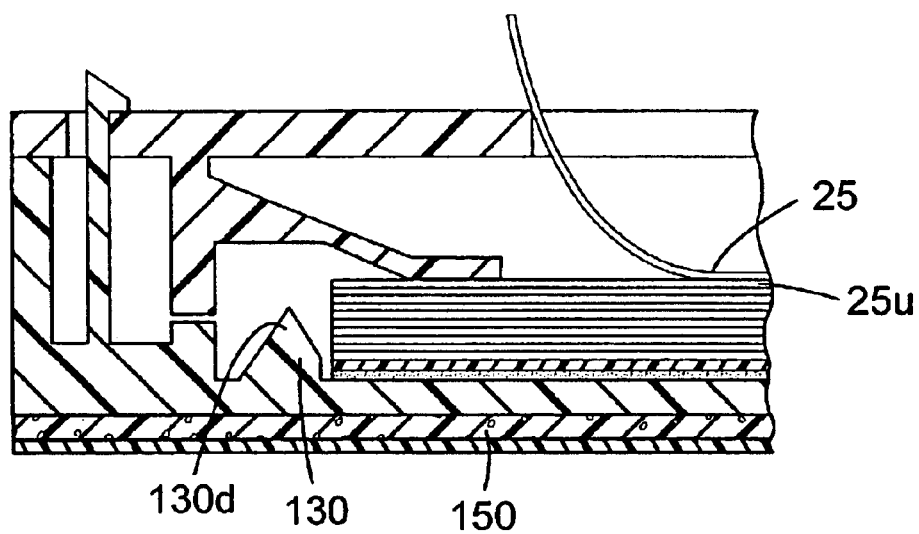
FIG. 5D is a sectional side view of the tape strip pad dispenser as shown in FIG. 5C wherein the overlaying tape strip has been fully detached from the intermediate tape strip and the second end of the intermediate tape strip is supported in a dispensing position by the top of the dispenser housing.
Figure 5E:
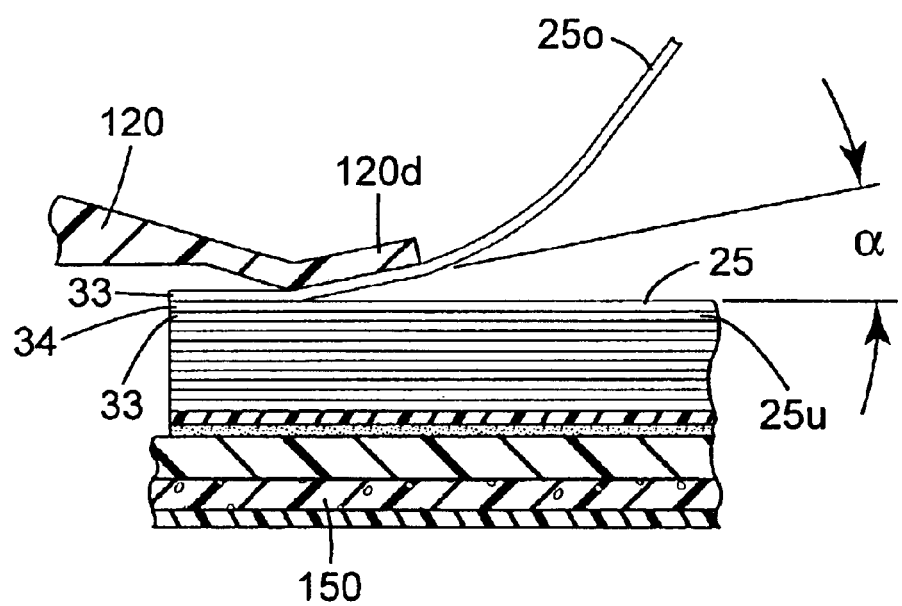
FIG. 5E is an enlarged sectional side view of the biased finger as shown in FIG. 5B.

As shown in FIG. 4F, the fingers 120 may be constructed so that the distal end 120d of the fingers 120 extend a distance over the first longitudinal end 33 of the overlaying tape strip 25o before contacting the overlaying tape strip 25o in order to prevent the fingers 120 from engaging the overlaying tape strip 25o between the first longitudinal end 33 of the overlaying tape strip 25o and the point of release. Such a longitudinal spacing of the contact point avoids any complications imposed by the exertion of a downward force upon that portion of the pad 10 where the differential release characteristics must be balanced in order to ensure that the intermediate tape strip 25i releases from the underlying tape strip 25u prior to complete release of the overlaying tape strip 25o from the intermediate tape strip 25i during dispensing of the overlaying tape strip 25o.

Alternatively, a low peel angle α may be maintained by a means for adjusting the transverse height of the pad 10 relative to the fingers 120 and/or the transverse height of the fingers 120 relative to the pad 10 as the thickness of the pad 10 is decreased due to dispensing of tape strips 20 from the pad 10. A number of methods for adjusting the height of a pad within the chamber of a dispenser are disclosed in U.S. Pat. Nos. 5,143,250; 5,080,255, 4,993,590, 4,986,440; 4,921,127; 5,080,254; 4,781,306; 4,653,666; 4,586,631; and 4,416,392. Of course, appropriate means must also be provided to maintain proper orientation of the pad 10 relative to the fingers 120.

In an alternative embodiment (not shown), the top pad 10 may be positioned within the retention chamber 117 relative to the top 111 of the housing 110 such that the first 111a and second 111b sections of the top 111 function as a means for maintaining a low peel angle α.

The dispenser 190 permits the consistent shear mode dispensing of individual tape strips 20 from a W-stacked pad 10 of tape strips 20 over a wide range of adhesive strengths for both the superior release area (i.e., the first end portion 33p) and the basic release area (i.e., the second end portion 34p) as well as a wide range in the ratio of basic adhesive strength (BAS) superior adhesive strength (SAS). While the ranges of these variables are interdependent, and dependent upon several other variables as well, including peel angle α, release length, and elasticity of the substrate 30, a W-stacked adhesive tape strip pad 10 constructed within the general parameters set forth below in Table 1 can generally be dispensed with minimal failure (i.e., without multi-sheet dispensing and/or tail off) when dispensed at peel angles α of between about 10° to 30° and a release length of ¹¹⁄₁₆ to ¼ of an inch. It is noted that an increase in either the SAS Sand/or the BAS (i.e., a "tighter" pad of adhesive tape strips) generally requires an increase in the ratio of BAS:SAS, a decrease in the peel angle and/or a decrease in the release length in order to maintain the desired dispensability of the pad 10. It is also noted that the stiffness and caliper of the substrate 30 can also impact the BAS:SAS ratio capable of preventing tail off.

TABLE 1

| Use |||
| --- | --- | --- |
| ADHESIVE STRENGTH |||
| Superior Adhesive Strength | Basic Adhesive Strength | RATIO BAS:SAS |
| 2–160 grams/inch | >100 grams/inch | ≧1.5:1 |

Dispensing of Individual Tape Strips

As shown in FIG. 3, and FIGS. 4A–F, the dispensing of individual tape strips 20 from the second embodiment of a W-stacked pad of tape strips 10 (i.e., differential release achieved with coatings of superior release and basic LAB on the first major surface 31 of the tape strips 20) retained within the dispenser 100 is initiated by (i) reaching through the central opening 119 in the housing 110 (usually with just the pointer finger) and lifting the nonadhesive tab 65 at the second longitudinal end 61 of the leader strip 60 through the central opening 119, (ii) pulling the leader strip 60 through the central opening 119 until the leader strip 60 contacts the downwardly biased finger 120, (iii) continuing to pull the leader strip 60 through the central opening 119 until the release combination of peel angle α and release length are reached, causing the second end portion 34p of the uppermost tape strip 21 to release from the first end portion 33p of an underlying tape strip 25u with the first end portion 62 of the leader strip 60 still attached to the second end portion 34p of the uppermost tape strip 21, (iv) further continuing to pull the leader strip 60 through the central opening 119 until the point of departure between the uppermost tape strip 21 and the underlying tape strip 25u has reached the demarcation line between the superior release portion and the basic release portion, wherein the full length of the leader strip 60 will have been pulled through the central opening 119 and the second end portion 34p of the uppermost tape strip 21—still adhered to the first end portion 62 of the leader strip 60—will have been pulled through the central opening 119, and (v) completing dispensing of the leader strip 60 by pulling on the leader strip 60 until the leader strip 60 completely separates from the uppermost tape strip 21 and allowing the second end portion 34p of the uppermost tape strip 21 to contact the corresponding top section 111a or 111b of the housing 111 so as to prevent the second end portion 34p of the uppermost tape strip 21 from returning to the pad 10.

As shown in FIG. 4A, and FIGS. 5A–E, subsequent tape strips 20 can be individually dispensed from the W-stacked pad of adhesive tape strips 10 by repeating steps (ii) through (v), wherein a dispensing set of an overlaying tape strip 25o, intermediate tape strip 25i and underlying tape strip 25u are involved rather than a leader strip 60, uppermost tape strip 21 and underlying tape strip 25u, respectively.

Replacing Spent Tape Strip Pad

A spent pad 10 can be replaced in the dispenser 100 by (i) bending at least one of the shoulder posts 140 into alignment with the corresponding orifice 118 and separating the upper portion 110u of the housing 110 from the lower portion 110v, (ii) peeling any remaining vestige of the spent pad 10 from the bottom 112 of the housing 110 (e.g., backing 70 and tape 80), (iii) removing the release liner 90 from the replacement pad 10, (iv) dropping the replacement pad 10 into position within the lower portion 110v of the housing using the guide nubs 130 to properly position the pad 10, and (v) returning the upper portion 110u of the housing into locked position over the lower portion 110v of the housing 110, with the downwardly biased fingers 120 contacting the top (unnumbered) of the pad 10.

This invention is further illustrated by the following examples that are not intended to limit the scope of the invention. In the examples, all parts, ratios and percentages are by weight unless otherwise indicated. The following test methods were used to evaluate and characterize the printing ink with additives compositions produced in the examples. All materials are commercially available, for example from Aldrich Chemicals (Milwaukee, Wis.), unless otherwise indicated or described.

EXAMPLES

Glossary

The following acronyms, abbreviations, and trade names are used throughout the Examples.

Test Methods
Dispensing Characteristics in Pad Form

A sample pad of W-stacked adhesive tape containing about seventy five ¾ inch wide by 2 inch long tape strips was prepared and conditioned for 24 hours at 25° C. and 50% relative humidity prior to testing. The test fixture used to measure the dispensing characteristics comprised a flat aluminum surface plate (6 inches×3 inches×0.14 inches) capable of being rotated between vertical (0° peel angle) and horizontal (90° peel angle) to which the pad of adhesive tape strip was adhered during testing. The angle of the surface plate was firmly fixed during testing by tightening an angle adjustment thumbscrew. The test fixture was positioned under the upper jaws of a tensile testing machine, commercially available as Model 1/S, from Sintech of Stoughton, Mass. The base stud was affixed to the testing machine deck by a locking pin inserted into drillouts in the base stud. The upper jaws of the tensile testing machine were attached to the machine crosshead and aligned across the width of the jaws coincident with the aluminum surface plate when the plate was rotated to the vertical position.

The second longitudinal end section of the top tape strip of the sample pad was peeled back a distance of 2.1 cm, without otherwise effecting the adhesion in the rest of the pad, and laminated between two (5 inch) opposing strips of strapping tape (e.g., Scotch™ Cat. No. 893 Premium Heavy Duty Strapping Tape) forming an extended end for gripping with the upper jaws of the tensile testing machine. The pad was then adhered to the flat aluminum surface plate that has been adjusted and secured to the desired peel angle for testing and the top tape strip peeled back to the desired dispensing length to be tested, without otherwise effecting the adhesion in the rest of the pad. The pad alignment on the surface plate was such that the point of departure was directly under the jaws and positioned as 0° relative to the machine centerline and aligned across the width of the jaws so that the peel force was substantially evenly distributed across the width of the sample. The upper jaws were positioned (4 inches) from the point of departure. The extended free end of the top tape strip was then securely gripped in the top jaws of the tensile testing machine such that the point of departure had not moved and there was no tension in the strip.

The top tape strip was then pulled by the upper jaws as the machine crosshead moves vertically at a rate of 12 inches/min. The load force and crosshead travel were measured and recorded. The test was stopped when the load force dropped to 10% of the peak value measure. A successful dispense was noted if either: (i) during the test the second longitudinal end section of the intermediate strip released from the first longitudinal end section of the underlying strip; or (ii) at the conclusion of the test the second longitudinal end section of the intermediate strip released from the first longitudinal end section of the underlying strip with the first longitudinal section of the top strip still adhered to the second longitudinal end of the intermediate strip by a distance defined to be the release length. Dispensing failures (i.e., multiple strip dispensing (MSD) and tail off (TO) were also observed and reported. Three replicates were run for each sample pad.

Unwind Strength

Unwind strength was measured in accordance with ASTM D 3811 conditioned for 24 hours at 25° C. and 50% relative humidity, except that a separation speed of 12 inches/minute was used and the average unwind strength rather than the maximum unwind strength was reported.

Construction of Tape Strip Pad

W-stacked tape strip pads of 35 to 80 individual 2 inch by ¾ inch tape strips were manufactured from standard #810 Scotch™ brand Magic™ tape or Scotch™ brand Satin tape (commercially available from 3M, St. Paul, Minn.) by pattern coating one end of the adhesive layer on the tape with Weirneke ink Surecure™ UV-210 UV curable varnish using a flexographic printing press in order to decrease the tack of the adhesive layer on that end of the tape and thereby creating a differential release between tapes by providing an area with a first (higher) adhesion level and an area with a second (lower) adhesion level on each tape. After the tape strips were pattern coated they were arranged in stacks as described hereinabove and referring to FIG. 1A. After the tape strips were arranged in stacks, the resulting pad was laminated to insure good adhesion between the individual strips.

Testing

The Unwind Strength and Dispensing Characteristics of W-stacked pads of adhesive tape strips constructed in accordance with the manufacturing procedure set forth above were tested in accordance with the testing protocols also set forth herein. Results of the tests are reported in Table 2, along with details of the composition of the tested tape strips. NOTE: "Acetate" refers to brightened cellulose acetate substrate and "BOPP" refers to biaxially oriented polypropylene.

TABLE 2

Unwind Strength and Dispensing Characteristics

| | TAPE STRIPS | | | | | DISPENSING | | |
| | | | Superior | Basic | | | | |
| Example | Substrate Material | Width (inch) | Unwind (gm per ¾ inch) | Unwind (gm per ¾ inch) | Ratio BAS: SAS | Peel Angle (°) | Dispensing Length (inches) | Failures (MSD or TO) |
|---|---|---|---|---|---|---|---|---|
| 1 | Acetate | ¾ | 21 | 146 | 7:1 | 10 | ⅛ | Dispensed |
| 2 | Acetate | ¾ | 21 | 146 | 7:1 | 10 | ¼ | Dispensed |
| 3 | Acetate | ¾ | 51 | 146 | 2.86:1 | 3 | ⅛ | Dispensed |

TABLE 2-continued

Unwind Strength and Dispensing Characteristics

| | TAPE STRIPS | | Superior | Basic | | DISPENSING | | |
|---|---|---|---|---|---|---|---|---|
| Example | Substrate Material | Width (inch) | Unwind (gm per ¾ inch) | Unwind (gm per ¾ inch) | Ratio BAS: SAS | Peel Angle (°) | Dispensing Length (inches) | Failures (MSD or TO) |
| 4 | Acetate | ¾ | 51 | 146 | 2.86:1 | 10 | 1/16 | Dispensed |
| 5 | Acetate | ¾ | 51 | 146 | 2.86:1 | 10 | 1/8 | Dispensed |
| 6 | Acetate | ¾ | 51 | 146 | 2.86:1 | 10 | ¼ | MSD |
| 7 | Acetate | ¾ | 51 | 146 | 2.86:1 | 10 | 3/8 | MSD |
| 8 | Acetate | ¾ | 51 | 146 | 2.86:1 | 20 | 1/8 | Dispensed |
| 9 | Acetate | ¾ | 51 | 146 | 2.86:1 | 20 | 3/8 | Dispensed |
| 10 | Acetate | ¾ | 51 | 146 | 2.86:1 | 30 | 1/8 | Dispensed |
| 11 | Acetate | ¾ | 51 | 146 | 2.86:1 | 30 | 3/8 | Dispensed |
| 12 | Acetate | ¾ | 51 | 146 | 2.86:1 | 40 | 1/8 | TO |
| 13 | Acetate | ¾ | 51 | 146 | 2.86:1 | 40 | 3/8 | TO |
| 14 | Acetate | ¾ | 64 | 146 | 2.28:1 | 10 | 1/16 | Dispensed |
| 15 | Acetate | ¾ | 64 | 146 | 2.28:1 | 10 | 1/8 | Dispensed |
| 16 | Acetate | ¾ | 64 | 146 | 2.28:1 | 10 | ¼ | MSD |
| 17 | Acetate | ¾ | 64 | 146 | 2.28:1 | 10 | 3/8 | MSD |
| 18 | Acetate | ¾ | 64 | 146 | 2.28:1 | 20 | 1/8 | Dispensed |
| 19 | Acetate | ¾ | 64 | 146 | 2.28:1 | 20 | 3/8 | MSD |
| 20 | Acetate | ¾ | 64 | 146 | 2.28:1 | 30 | 1/8 | Dispensed |
| 21 | Acetate | ¾ | 64 | 146 | 2.28:1 | 30 | 3/8 | Dispensed |
| 22 | Acetate | ¾ | 64 | 146 | 2.28:1 | 40 | 1/8 | TO |
| 23 | Acetate | ¾ | 64 | 146 | 2.28:1 | 40 | 3/8 | TO |
| 24 | BOPP | ¾ | 116 | 170 | 1.46:1 | 3 | 1/8 | Dispensed |
| 25 | BOPP | ¾ | 116 | 170 | 1.46:1 | 10 | 1/16 | Dispensed |
| 26 | BOPP | ¾ | 116 | 170 | 1.46:1 | 10 | 1/8 | Dispensed |
| 27 | BOPP | ¾ | 116 | 170 | 1.46:1 | 10 | 3/8 | MSD |
| 28 | BOPP | ¾ | 116 | 170 | 1.46:1 | 20 | 1/8 | Dispensed |
| 29 | BOPP | ¾ | 116 | 170 | 1.46:1 | 20 | ¼ | MSD |
| 30 | BOPP | ¾ | 116 | 170 | 1.46:1 | 20 | 3/8 | MSD |
| 31 | BOPP | ¾ | 116 | 170 | 1.46:1 | 30 | 1/8 | Dispensed |
| 32 | BOPP | ¾ | 116 | 170 | 1.46:1 | 30 | 3/8 | MSD |
| 33 | BOPP | ¾ | 116 | 170 | 1.46:1 | 40 | 1/8 | TO |
| 34 | BOPP | ¾ | 116 | 170 | 1.46:1 | 40 | 3/8 | MSD |
| 35 | BOPP | ¾ | 15.1 | 260.3 | 1:17.2 | 90 | 1 | Dispensed |
| 36 | BOPP | ¾ | 15.1 | 260.3 | 1:17.2 | 60 | 1 | Dispensed |
| 37 | BOPP | ¾ | 15.1 | 260.3 | 1:17.2 | 40 | 1 | Dispensed |
| 38 | BOPP | ¾ | 15.1 | 260.3 | 1:17.2 | 30 | 1 | Dispensed |
| 39 | BOPP | ¾ | 15.1 | 260.3 | 1:17.2 | 20 | 1 | Dispensed |
| 40 | BOPP | ¾ | 15.1 | 260.3 | 1:17.2 | 10 | 1 | Dispensed |
| 41 | Acetate | ¾ | 39.7 | 116.1 | 1:2.92 | 90 | 1/8 | TO |
| 42 | Acetate | ¾ | 39.7 | 116.1 | 1:2.92 | 70 | 1/8 | TO |
| 43 | Acetate | ¾ | 39.7 | 116.1 | 1:2.92 | 50 | 1/8 | TO |
| 44 | Acetate | ¾ | 39.7 | 116.1 | 1:2.92 | 40 | 1/8 | Dispensed |
| 45 | Acetate | ¾ | 39.7 | 116.1 | 1:2.92 | 30 | 1/8 | Dispensed |
| 46 | Acetate | ¾ | 39.7 | 116.1 | 1:2.92 | 10 | 1/8 | Dispensed |
| 47 | Acetate | ¾ | 39.7 | 116.1 | 1:2.92 | 90 | ¼ | TO |
| 48 | Acetate | ¾ | 39.7 | 116.1 | 1:2.92 | 60 | ¼ | TO |
| 49 | Acetate | ¾ | 39.7 | 116.1 | 1:2.92 | 50 | ¼ | TO |
| 50 | Acetate | ¾ | 39.7 | 116.1 | 1:2.92 | 40 | ¼ | Dispensed |
| 51 | Acetate | ¾ | 39.7 | 116.1 | 1:2.92 | 30 | ¼ | MSD |
| 52 | Acetate | ¾ | 39.7 | 116.1 | 1:2.92 | 20 | ¼ | MSD |
| 53 | BOPP | ¾ | 122.1 | 186.0 | 1:1.52 | 90 | 1 | TO |
| 54 | BOPP | ¾ | 122.1 | 186.0 | 1:1.52 | 60 | 1 | TO |
| 55 | BOPP | ¾ | 122.1 | 186.0 | 1:1.52 | 40 | 1 | TO |
| 56 | BOPP | ¾ | 122.1 | 186.0 | 1:1.52 | 30 | 1 | Dispensed |
| 57 | BOPP | ¾ | 122.1 | 186.0 | 1:1.52 | 20 | 1 | MSD |
| 58 | BOPP | ¾ | 122.1 | 186.0 | 1:1.52 | 10 | 1 | MSD |
| 59 | Acetate | ¾ | 22.0 | 116.1 | 1:5.28 | 90 | 1 | Dispensed |
| 60 | Acetate | ¾ | 22.0 | 116.1 | 1:5.28 | 60 | 1 | Dispensed |
| 61 | Acetate | ¾ | 22.0 | 116.1 | 1:5.28 | 50 | 1 | Dispensed |
| 62 | Acetate | ¾ | 22.0 | 116.1 | 1:5.28 | 40 | 1 | Dispensed |

Various modifications and alterations of this invention will become apparent to those skilled in the art without departing from the scope and principles of this invention, and it should be understood that this invention is not to be unduly limited to the illustrative embodiments set forth hereinabove. All publications and patents are incorporated herein by reference to the same extent as if each individual publication or patent was specifically and individually indicated to be incorporated by reference.

What is claimed:

1. A W-stacked pad of adhesive tape strips comprising a plurality of superimposed tape strips wherein:

a. the tape strips include:

b. a substrate having first and second opposite major surfaces, first and second opposite longitudinal ends, a first longitudinal end portion adjacent the first end and a second longitudinal end portion adjacent the second end; and c. a layer of an adhesive on the second major surface of the substrate;

d. sequential tape strips are longitudinally reversed so as to align the first end of each tape strip with the second end of an immediately overlaying and an immediately underlying tape strip;

e. the adhesive layer of each tape strip is releasably adhered to an adjacent tape strip such that the first major surface of an intermediate tape strip is adjacent the second major surface of an immediately overlying tape strip and the second major surface of the intermediate tape strip is adjacent the first major surface of an immediately underlying tape strip;

f. the second end portion of each tape strip is adhered to the first end portion of an immediately overlying tape strip at a first adhesion level, with (i) the first adhesion level having an adhesive level, and (ii) the first adhesion level having an adhesive strength effective for affording a complete release of the overlying tape strip from the intermediate tape strip after the second end portion of the intermediate tape strip is released from the first end portion of the immediately underlying tape strip and before the intermediate tape strip is completely peeled from the second end portion of the immediately underlying tape strip; and g. the first end portion of each tape strip is adhered to the second end portion of an immediately overlying tape strip at a second adhesion level, the second adhesion level being less than the first adhesion level and adapted such that as the overlying tape strip is dispensed from the pad at a high peel angle, the second adhesion level between the first end portion of the underlying tape strip and the second end portion of the intermediate strip prevents the intermediate tape strip from releasing from the first end portion of the underlying tape strip and allows the second end portion of the intermediate tape strip to release from the first end portion of the underlying tape strip when the overlying tape strip is dispensed from the pad at a low peel angle.

2. The pad of claim 1 having an uppermost tape strip having an exposed first major surface, and a lowermost tape strip having an exposed second major surface, and further comprising a leader strip aligned with and superimposed over the exposed first major surface of the uppermost tape strip with:

a. a tacky longitudinal end portion of the leader strip positioned over and adhesively bonded to the second longitudinal end portion of the exposed first major surface of the uppermost tape strip at an initiatory adhesion level, with (i) the initiatory adhesion level having an adhesive strength sufficiently greater than the adhesive strength of the second adhesion level that the second end portion of the uppermost tape strip releases from the first end portion of an immediately underlying tape strip prior to complete release of the second end portion of the uppermost tape strip from the tacky end portion of the leader strip as the leader strip is peeled from the pad, whereby the second end of the uppermost tape strip is lifted from the pad as the leader strip is pulled from the pad; and b. a nontacky longitudinal end portion of the leader strip is positioned intermediate the first and second longitudinal ends of the uppermost tape strip so as to form a nontacky pull tab.

3. The pad of claim 1 packaged for retail sale.

4. The pad of claim 1 wherein the ratio of the adhesive strength of the second adhesion level and the adhesive strength of the first adhesion level is between about 1:4 to 1:8.

5. The pad of claim 1 further comprising a layer of low adhesion backsize on the first end portion of the first major surface of the substrate.

6. The pad of claim 1 further comprising a layer of a superior release low adhesion backsize on the first end portion of the first major surface of the substrate and a layer of a basic low adhesion backsize on the second end portion of the first major surface of the substrate.

7. The pad of claim 1 further comprising a layer of low adhesion backsize on the first major surface of the substrate wherein the exposed layer of low adhesion backsize is a coating of an ink receptive first low adhesion backsize on the first end portion of the substrate and a coating of ink receptive second low adhesion backsize on the second end portion of the substrate, wherein the first and second low adhesion backsides have different characteristics so as to be effective for contributing to the differential adhesive strengths between the first and second end portions of the tape strip.

8. The pad of claim 1, further comprising a layer of low adhesion backsize on the first major surface of the substrate wherein the layer of low adhesion backsize is a continuous coating of low adhesion backsize on the first end portion of the substrate and a discontinuous coating of low adhesion backsize on the second end portion of the substrate, wherein the areas having continuous and discontinuous coatings of low adhesion backsize have different release characteristics so as to be effective for contributing to the differential adhesive strengths between the first and second end portions of the tape strip.

9. The pad of claim 1 wherein the layer of adhesive is a coating of a first pressure sensitive adhesive on the first end portion of the substrate and a coating of a second pressure sensitive adhesive on the second end portion of the substrate, wherein the first and second pressure sensitive adhesives have different adhesion levels so as to be effective for contributing to the differential adhesive strengths between the first and second end portions of the tape strip.

10. The pad of claim 1 wherein the layer of adhesive is a continuous coating of a pressure sensitive adhesive on the first end portion of the substrate and a discontinuous coating of a pressure sensitive adhesive on the second end portion of the substrate, wherein the areas having continuous and discontinuous coatings of pressure sensitive adhesives have different adhesion levels so as to be effective for contributing to the differential adhesive strengths between the first and second end portions of the tape strip.

11. The pad of claim 1, wherein the first end portion of each tape strip is defined from the first end to a first end portion termination point along a length of the substrate, and further wherein the first and second adhesion levels are selected such that as the overlying tape strip is dispensed, initiating at the second end thereof, at a high peel angle, the second adhesion level adheres the second end portion of the intermediate tape strip to the first end portion of the immediately underlying tape strip to promote release of the first end portion of the overlying tape strip from the second end portion of the intermediate tape strip in a region of the first end portion termination point of the underlying strip prior to release of the second end of the intermediate tape strip from the first end of the immediately underlying tape strip.

12. A W-stacked pad of adhesive tape strips comprising a plurality of superimposed tape strips wherein:
a. the tape strips include:
b. a substrate having first and second opposite major surfaces, first and second opposite longitudinal ends, a first longitudinal end portion adjacent the first end and a second longitudinal end portion adjacent the second end; and
c. a layer of an adhesive on the second major surface of the substrate;
d. a coating of a first ink receptive low adhesion backsize on the first end portion of the first major surface of the substrate;
e. a coating of a second ink receptive low adhesion backsize on the second end portion of the first major surface of the substrate;
f. sequential tape strips are longitudinally reversed so as to align the first end of each tape strip with the second end of an immediately overlaying and an immediately underlying tape strip; and
g. the adhesive layer of each tape strip is releasably adhered to an immediately underlying tape strip;
h. wherein the first and second low adhesion backsizes have different characteristics for contributing to differential adhesive strengths between the first and second end portions of the tape strip relative to an immediately overlying tape strip.

13. The pad of claim 12, wherein the first low adhesion backsize is characterized by an adhesion level that is greater than an adhesion level of the second low adhesion backsize.

* * * * *

UNITED STATES PATENT AND TRADEMARK OFFICE
CERTIFICATE OF CORRECTION

PATENT NO.         : 6,756,100 B2                                Page 1 of 2
APPLICATION NO.    : 10/334834
DATED              : June 29, 2004
INVENTOR(S)        : Scott D. Pearson It is certified that error appears in the above-identified patent and that said Letters Patent is hereby corrected as shown below:

In column 1, line 21, insert --,-- after "e.g.".

In column 1, line 45 delete "'706" and insert -- '706 --.

In column 1, line 45 delete "'746" and insert-- '746 --.

In column 1, line 47 delete "'706" and insert --'706 --.

In column 1, line 48 delete "'746" and insert --'746 --.

In column 2, line 12 delete "'47" and insert --'547 --.

In column 2, line 20 delete "'547" and insert -- '547 --.

In column 2, line 30 delete "'547" and insert -- '547 --.

In column 2, line 37 delete "'547" and insert --'547 --.

In column 2, line 46 delete "'547" and insert -- '547 --.

In column 4, line 25, delete " , " after "LAB".

In column 4, line 26, insert -- , -- after "e.g.".

In column 4, line 40, delete " , " after "an".

In column 5, line 14, delete "," after "departure".

In column 7, line 20, delete "land" and insert -- and --.

In column 7, line 45, delete "and 2,607,711".

In column 8, line 1, delete "30" after "the"

In column 8, line 13, insert -- , -- after "e.g.".

In column 8, line 18, delete "a" after "an".

In column 10, line 9, delete "." after "adhesive".

In column 11, line 15, delete "," after "(lower)".

UNITED STATES PATENT AND TRADEMARK OFFICE
CERTIFICATE OF CORRECTION

| | |
|---|---|
| PATENT NO. | : 6,756,100 B2 |
| APPLICATION NO. | : 10/334834 |
| DATED | : June 29, 2004 |
| INVENTOR(S) | : Scott D. Pearson |

It is certified that error appears in the above-identified patent and that said Letters Patent is hereby corrected as shown below:

In column 11, line 20, delete ";" after "the".

In column 11, line 41, delete "," after "used".

In column 13, line 48, delete "190" and insert -- 100 --.

In column 13, line 61, delete "11/16" and insert -- 1/16 --.

In column 13, line 63, delete "Sand" and insert -- and --.

In column 14, line 6, in Table 1, delete "Use".

In column 14, line 13, insert -- Use -- above "Dispensing of Individual Tape Strips" as a new heading.

Signed and Sealed this

Second Day of October, 2007

JON W. DUDAS
*Director of the United States Patent and Trademark Office*